United States Patent
Fukagawa et al.

(10) Patent No.: US 7,474,035 B2
(45) Date of Patent: Jan. 6, 2009

(54) DRIVING DEVICE FOR PIEZOELECTRIC ACTUATOR

(75) Inventors: Yasuhiro Fukagawa, Obu (JP); Tsutomu Nakamura, Kariya (JP); Takamichi Kamiya, Kasugai (JP); Noboru Nagase, Anjo (JP); Hideo Naruse, Chiryu (JP)

(73) Assignees: Denso Corporation (JP); Nippon Soken, Inc. (JP)

( * ) Notice: Subject to any disclaimer, the term of this patent is extended or adjusted under 35 U.S.C. 154(b) by 46 days.

(21) Appl. No.: 11/808,180

(22) Filed: Jun. 7, 2007

(65) Prior Publication Data
US 2007/0296307 A1 Dec. 27, 2007

(30) Foreign Application Priority Data
Jun. 23, 2006 (JP) ............................. 2006-173883

(51) Int. Cl.
*H01L 41/09* (2006.01)
*H02N 2/16* (2006.01)

(52) U.S. Cl. .................................. 310/316.03; 123/490
(58) Field of Classification Search ............. 310/316.03
See application file for complete search history.

(56) References Cited

U.S. PATENT DOCUMENTS

| 4,732,129 A | * | 3/1988 | Takigawa et al. | ............. | 123/478 |
| 6,016,040 A | * | 1/2000 | Hoffmann et al. | ............. | 318/116 |
| 6,121,715 A | * | 9/2000 | Hoffmann et al. | ............. | 310/316.03 |
| 6,133,714 A | * | 10/2000 | Hoffmann et al. | ............. | 320/166 |
| 6,212,053 B1 | * | 4/2001 | Hoffmann et al. | ............. | 361/169.1 |
| 6,236,190 B1 | | 5/2001 | Hoffmann et al. | | |
| 6,617,755 B2 | * | 9/2003 | Kawamoto | ............. | 310/316.03 |
| 6,619,268 B2 | | 9/2003 | Rueger et al. | | |
| 6,661,155 B2 | * | 12/2003 | Schrod | ............. | 310/316.01 |
| 6,661,285 B1 | * | 12/2003 | Pompei et al. | ............. | 330/251 |
| 6,979,933 B2 | * | 12/2005 | Oudshoorn et al. | ............. | 310/316.03 |
| 7,034,437 B2 | * | 4/2006 | Fukagawa et al. | ............. | 310/316.03 |
| 7,190,102 B2 | * | 3/2007 | VanderSluis | ............. | 310/316.03 |
| 2003/0164160 A1 | * | 9/2003 | Schrod | ............. | 123/490 |
| 2008/0072879 A1 | * | 3/2008 | Nagase et al. | ............. | 123/494 |

FOREIGN PATENT DOCUMENTS

| JP | 06-177449 | 6/1994 |
| JP | 2005-016431 | 1/2005 |
| JP | 2006-237335 | 9/2006 |

\* cited by examiner

*Primary Examiner*—Jaydi A San Martin
(74) *Attorney, Agent, or Firm*—Nixon & Vanderhye PC

(57) ABSTRACT

In a driving device for a piezoelectric actuator, when a driving signal is input, a charging switch is repetitively turned on/off to charge and expand the piezoelectric actuator under the state that a discharging switch is turned off. Thereafter, when the input of the driving signal is stopped, the discharging switch is repetitively turned on/off under the state that the charging switch is turned off, thereby discharging and contracting the piezoelectric actuator. Particularly, during the charging period, the charging switch is turned on at a fixed period, and the charging switch is turned off when an integration value of current flowing in a charging circuit at the ON-time of the charging switch reaches a target charge amount.

6 Claims, 14 Drawing Sheets

US 7,474,035 B2

DRIVING DEVICE FOR PIEZOELECTRIC ACTUATOR

CROSS REFERENCE TO RELATED APPLICATION

This application is based on and incorporates herein by reference Japanese Patent Application No. 2006-173883 filed on Jun. 23, 2006.

FIELD OF THE INVENTION

The present invention relates to a driving device for charging and discharging a piezoelectric actuator to expand and contract the piezoelectric actuator.

BACKGROUND OF THE INVENTION

A conventional driving device for charging and discharging a piezoelectric actuator to expand and contract the piezoelectric actuator includes a charging circuit and a discharging circuit, as disclosed in JP 2005-16431A for example. In the charging circuit, electric power is supplied from a DC power source through a charging switch having MOSFET to a series circuit of an inductor and the piezoelectric actuator. The discharging circuit is connected to the series circuit in parallel. In the discharging circuit, electric charges charged in the piezoelectric actuator are discharged through a discharging switch having MOSFET.

In this driving device, when a driving signal is input from an external device to the driving device, the charging switch is repetitively turned on/off while the discharging switch is in the turned-off state, thereby charging the piezoelectric actuator and thus expanding the piezoelectric actuator. Then, when no driving signal is input, the discharging switch is repetitively turned on/off while the charging switch is in the turned-off state, thereby discharging the piezoelectric actuator and thus contracting the piezoelectric actuator.

That is, during the charging period, the piezoelectric actuator is charged in stepwise manner according to the following procedure. That is, the charging switch is turned on while the discharging switch is turned off, whereby charging current flows from the DC power source through the charging circuit into the piezoelectric actuator. Thereafter, the charging switch is turned off so that the charging current (flywheel current) flowing by means of the energy accumulated in an inductor is made to flow from the negative side of the piezoelectric actuator to the positive side thereof through a parasitic diode of MOSFET used as the discharging switch.

On the other hand, during the discharging period, the piezoelectric actuator is discharged in stepwise manner according to the following procedure. That is, the discharging switch is turned on while the charging switch is turned off to make the discharging current flow from the positive side of the piezoelectric actuator to the discharging circuit. Thereafter, the discharging switch is turned off so that charging power is regenerated to the DC power source by a flyback voltage generated by the energy accumulated in the inductor.

In this type of driving device, a desired charge amount is charged into the piezoelectric actuator by controlling the amount of charges per unit time which are supplied from the DC power source.

That is, when the driving signal is input to this driving device, the charging switch is turned on, and then turned off at the time point when the integration value of the charging current flowing into the piezoelectric actuator reaches a predetermined target value. Thereafter, the charging switch is turned on when the charging current reaches a smaller predetermined value than the target value concerned. This turn-on/off operation is repeated, thereby charging the piezoelectric actuator.

Since the electrostatic capacitance of the piezoelectric actuator varies in accordance with temperature, the current amount of charging current flowing into the piezoelectric actuator at the charging time varies in accordance with surrounding conditions under which the piezoelectric actuator is used.

When the electrostatic capacitance of the piezoelectric actuator is varied, the amount of current flowing from the DC power source into the piezoelectric actuator when the charging switch is turned on is varied, and thus the energy accumulated in the inductor at that time also varies. Therefore, the time required until the discharging of the energy from the inductor is completed under the state that the charging switch is turned off is also varied.

Therefore, during the charging period, the timing at which the charging switch is turned on is varied in accordance with the variation of the electrostatic capacitance of the piezoelectric actuator, and thus the variation amount of charges accumulated in the piezoelectric actuator (that is, the expansion rate at which the piezoelectric actuator expands per unit time) is varied in some cases.

For example, in a case where the conventional driving device is used to control the fuel injection of an injector so that fuel injection is started at the time when the piezoelectric actuator expands by a predetermined amount, the timing of the fuel injection of the injector is varied, and thus it is impossible to perform high-precision fuel injection.

SUMMARY OF THE INVENTION

The present invention therefore has an object to provide a driving device for a piezoelectric actuator that reduces variation of the expansion rate of a piezoelectric actuator due to variation of an electrostatic capacitance.

In order to attain the above object, a driving device for a piezoelectric actuator has: an inductor connected to the piezoelectric actuator in series so that an inductor and the piezoelectric actuator forms a series circuit; a charging circuit for supplying power from a DC power source through a charging switch to the series circuit; and a discharging circuit that is connected to the series circuit in parallel and discharging charges charged in the piezoelectric actuator through a discharging switch.

When a driving instruction is input from an external device, a charge/discharge control unit repeats the turn-on/off operation of the charging switch under the state that the discharging switch is turned off, thereby charging and expanding the piezoelectric actuator. Thereafter, when a driving stop instruction is input from the external device, the charge/discharge control unit repeats the turn-on/off operation of the discharging switch under the state that the charging switch is turned off, thereby discharging and contracting the piezoelectric actuator.

The charge/discharge control unit includes a target value setting section, a current detecting section, an estimating section and a charging switch driving section. The target value setting section sets a target value of charge energy to be charged in the piezoelectric actuator during ON-period of the charging switch on the basis of the charge energy to be charged in the piezoelectric actuator during one charging period by the driving device, and a power supply voltage of the DC power source.

When the driving instruction is input, the charging switch driving section turns on the charging switch at a preset period, and turns off the charging switch every time an estimation value estimated by the estimating section reaches the target value set by the target value setting section.

The period when the charging switch driving section turns on the charging switch, and the charging amount of the piezoelectric actuator in one turn-on operation of the charging switch can be fixed. Therefore, the expansion rate of the piezoelectric actuator in the charging period can be set to a desired expansion rate.

Accordingly, even when the electrostatic capacitance of the piezoelectric actuator is varied due to temperature variation or the like, the expansion rate of the piezoelectric actuator can be prevented from being varied.

Furthermore, when the driving device is applied to fuel injection control for a fuel injector that starts the fuel injection at the time when the piezoelectric actuator expands by a predetermined amount, the variation of the fuel injection timing of the injector is reduced even when the electrostatic capacitance varies.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
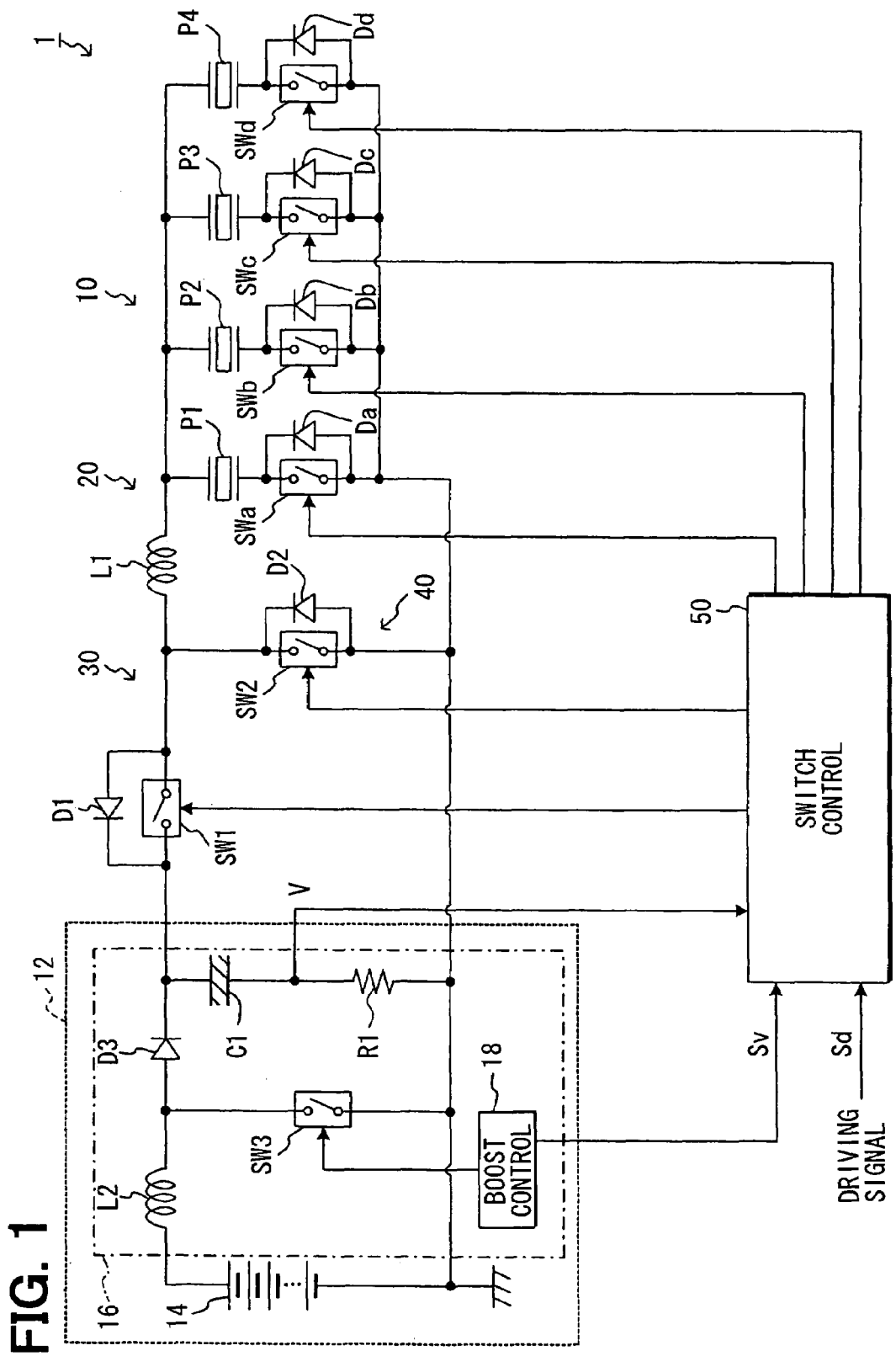
FIG. 1 is a circuit diagram showing a driving device for a piezoelectric actuator according to a first embodiment of the present invention.

Referring first to FIG. 1, a driving device 1 is designed to charge/discharge four piezoelectric actuators P1 to P4 mounted in fuel injectors for injecting fuel in an internal combustion engine of a vehicle by expanding/contracting the piezoelectric actuators, thereby making each fuel injector provided on each cylinder of the engine start/stop the fuel injection.

The driving device 1 includes an inductor L1 that is connected in series to a parallel circuit 10 having the four piezoelectric actuators P1 to P4 connected to one another in parallel, a power supply circuit 12 for boosting a battery voltage from a storage battery 14 to generate a power supply voltage, a charging circuit 30 supplying electric power from the power supply circuit 12 through a charging switch SW1 to a series circuit 20 having the inductor L1 and the parallel circuit 10, a discharging circuit 40 that is connected to the series circuit in parallel to discharge charges charged in the piezoelectric actuators P1 to P4 through a discharging switch SW2, a current detecting resistor R1 for detecting current supplied from the power supply circuit 12 to the piezoelectric actuators P1 to P4 at the charging time, and a switch controller 50 for controlling the turn-on/off operations of the charging switch SW1 and the discharging switch SW2.

The parallel circuit 10 includes a first series circuit having the piezoelectric actuator P1 and a cylinder selecting switch SWa, a second series circuit having the piezoelectric actuator P2 and a cylinder selecting switch SWb, a third series circuit having the piezoelectric actuator P3 and a cylinder selecting switch SWc, and a fourth series circuit having the piezoelectric actuator P4 and a cylinder selecting switch SWd. These series circuits are connected to one another in parallel.

One end portion of the parallel circuit 10 at the piezoelectric actuator (P1 to P4) side is connected to one end of the inductor L1, and the other end portion of the parallel circuit 10 at the cylinder selecting switch (SWa to SWd) side is connected to a ground line which is connected to the negative-side of the power supply circuit 12.

Each of the cylinder selecting switches SWa to SWd is an n-channel MOSFET; The source of each n-channel MOSFET is connected to the ground line, the drain thereof is connected to one end of the corresponding piezoelectric actuator (P1 to P4), and the gate thereof is connected to an output terminal of the switch controller 50.

A diode Da is connected to the cylinder selecting switch SWa in parallel, a diode Db is connected to the cylinder selecting switch SWb in parallel, a diode Dc is connected to the cylinder selecting switch SWc in parallel, and a diode Dd is connected to the cylinder selecting switch SWd in parallel.

The anode of each of the diodes Da to Dd is connected to the ground line, and the cathode thereof is connected to the connection point between each piezoelectric actuator (P1 to P4) and the drain of each cylinder selecting switch (SWa to SWd). By using MOSFETs for the cylinder selecting switch SWa to SWd, the parasitic diodes of the MOSFETs may be used as the diodes Da to Dd.

One end portion of the series circuit 20 at the inductor L1 side is connected to the positive-side of the power supply circuit 12 through the charging switch SW1. The charging switch SW1 is an n-channel MOSFET. The source of the n-channel MOSFET is connected to one end of the inductor L1, the drain thereof is connected to the positive-side of the power supply circuit 12, and the gate thereof is connected to an output terminal of the switch controller 50.

Furthermore, a diode D1 is connected to the charging switch SW1 in parallel, and the diode D1 serves to allow regenerated current to flow into the power supply circuit 12, when the discharging switch SW2 is turned off at the discharging time of the piezoelectric actuators P1 to P4. By using MOSFET as the charging switch SW1, the parasitic diode of the MOSFET may be used as the diode D1.

The charging switch SW2 is an n-channel MOSFET The source of the n-channel MOSFET is connected to the ground line, the drain thereof is connected to the connection point between the charging switch SW1 and the inductor L1, and the gate thereof is connected to an output terminal of the switch controller 50.

Furthermore, a diode D2 is connected to the discharging switch SW2 in parallel, and the diode D2 serves to allow flywheel current to flow, when the charging switch SW1 is turned off at the charging time of the piezoelectric actuators P1 to P4. By using MOSFET for the discharging switch SW2, the parasitic diode of the MOSFET may be used as the diode D2.

The power supply circuit 12 has a boosting circuit 16 for boosting the battery voltage (for example, 12V) from the battery 14. The negative-side terminal of the battery 14 is connected to the ground line.

The boosting circuit 16 has a boosting inductor L2 whose one end is connected to the positive-side terminal of the battery 14, a diode D3 whose anode is connected to the other end of the boosting inductor L2 and whose cathode is connected to the drain of the charging switch SW1, a boosting switch SW3 which is connected to the connection point between the diode D3 and the boosting inductor L2 at one end thereof and also connected to the ground line at the other end thereof, a boosting control circuit 18 for turning on/off the boosting switch SW3, and a buffer capacitor C1 which is connected to the connection point between the diode D3 and the charging switch SW1 at one end thereof and also connected to the ground line through the current detecting resistor R1 at the other end thereof. The diode D3 is used to prevent discharge of the buffer capacitor C1.

The boosting control circuit 18 repetitively turns on/off the boosting switch SW3 to charge a voltage of several tens to several hundreds volts into the buffer capacitor C1 through the diode D3. The boosting control circuit 18 is designed to detect the voltage value V of the buffer capacitor C1, and outputs a voltage value signal S representing the voltage value V to the switch controller 50.

When the charging switch SW1 and the cylinder selecting switch SWa to SWd are turned on, the buffer capacitor C1 makes current flow into the charging circuit 30 to charge the piezoelectric actuator (P1 to P4) corresponding to the turned-on cylinder selecting switch (SWa to SWd).

Here, the current flowing from the buffer capacitor C1 into the series circuit 20 when the piezoelectric actuator P1 to P4 is charged is called as a buffer capacitor current Ic1. Furthermore, the buffer capacitor C1 is designed to have a relatively large electrostatic capacitance, and it keeps a substantially fixed voltage value when power is supplied to the piezoelectric actuators P1 to P4.

When a driving signal Sd output from an external ECU (not shown) for performing the engine control of the vehicle is input to the switch controller 50, the switch controller 50 turns on the cylinder selecting switch SWa to SWd which is specified by the driving signal Sd, and also repetitively turns on/off the charging switch SW1 for a predetermined time under the state that the discharging switch SW2 is turned off.

At this time, the switch controller 50 periodically turns on the charging switch SW1, and also integrates the buffer capacitor current Ic1 with time. When the integration value reaches a predetermined value, the switch controller 50 turns off the charging switch SW1.

When no driving signal Sd is input, the switch controller 50 repetitively turns on/off the discharging switch SW2 under the state that the charging switch SW1 is turned off.

Next, a part of the switch controller 50 which controls the charging switch SW1 will be described in detail with reference to FIG. 2. The detailed description on a part of the switch controller 50 which controls the discharging switch SW2 is omitted because it is not directly associated with the present invention.

The switch controller 50 has a current detecting circuit 60 for detecting the buffer capacitor current Ic1, a current integrating circuit 70 for integrating the buffer capacitor current detected by the current detecting circuit 60 with time, a determining circuit 80 for determining whether the integration result calculated by the current integrating circuit 70 reaches a target charge amount Q, and a charging switch controller 90 for turning on the charging switch SW1 periodically when the driving signal Sd is input and turning off the charging switch SW1 on the basis of the determination result of the determining circuit 80.

The current detecting circuit 60 has resistors R2, R3, R4 and R5 and an operational amplifier OP1. The connection point between the current detecting resistor R1 and the buffer capacitor C1 is connected through the resistor R2 to the non-inverting input terminal (+) of the operational amplifier OP1, the connection point between the current detecting resistor R1 and the ground line is connected through the resistor R3 to the inverting input terminal (−) of the operational amplifier OP1.

Thus, a current detection signal Sc is output from the output terminal of the operational amplifier OP1. The current detection signal Sc represents a voltage value acquired by amplifying the potential difference between both the ends of the current detecting resistor R1 at a predetermined gain. A reference voltage Vref (for example, 2.5[V]) for setting the offset of the buffer capacitor current is input through the resistor R5 to the non-inverting input terminal (+) of the operational amplifier OP1.

The current integrating circuit 70 has an integrating circuit 72 for integrating the current detection signal Sc with time, and an integration reset switch SW4 for resetting the integration result of the integrating circuit 72. The integration circuit 72 has a resistor R6, a capacitor C2 and an operational amplifier OP2. The reference voltage Vref is input to the non-inverting input terminal (+) of the operational amplifier OP2, and the current detection signal Sc is input through the resistor R6 to the inverting input terminal (−) of the operational amplifier OP2. Thus, a signal acquired by integrating the current detection signal Sc with time (hereinafter referred to as integration signal Si) is output from the output terminal of the operational amplifier OP2. The integration reset switch SW4 is connected to the capacitor C2 in parallel, and it is turned on to discharge the charges accumulated in the capacitor C2.

The determining circuit 80 has resistors R7, R8, R9 and a comparator CMP1. The integration signal Si is input through the resistor R7 to the inverting input terminal (−) of the comparator CMP1, and the target charge amount Q (specifically, a target charge amount setting signal So) output from the charging switch controller 90 is input through the resistor R8 to the non-inverting input terminal (+) of the comparator CMP1.

Furthermore, the determining circuit 80 is constructed as a comparator CMP1 with hysteresis (Schmidt trigger) for changing over the magnitude of the target charge amount Q between two values in accordance with the output signal of the comparator CMP1. That is, the comparator CMP1 adds the output signal from the output terminal to the target charge amount Q by the resistor R9 connected to the output terminal and the non-inverting input terminal (+), and switches over the target charge amount input to the non-inverting input terminal (+), that is, to a value larger than the target charge amount Q and a value smaller than the target charge amount Q.

In the determining circuit 80, where the signal level of the output signal of the comparator CMP1 (determination signal Sh) is high, the signal level of the determination signal Sh becomes low when the charge amount represented by the integration signal Si exceeds the value by adding the target charge amount Q with the amount corresponding to the hysteresis. Conversely, the signal level of the determination signal Sh becomes high when the charge amount represented by the integration signal Si is lower than the value acquired by subtracting the amount corresponding to the hysteresis from the target charge amount Q.

The charging switch controller 90 is mainly constructed by CPU, RAM, ROM, etc., and the driving signal Sd, the determination signal Sh, the voltage value signal Sv, etc. are input to the charging switch controller 90.

Furthermore, ROM of the charging switch controller 90 stores one charging period Tc, an energy instruction value E representing the charge energy to be charged to the piezoelectric actuators P1 to P4 during the charging period Tc, a switching period Ts representing the turn-on period of the charging switch SW1 in the charging period Tc, a switching frequency N representing the frequency at which the charging switch SW1 is turned on during the charging period Tc, etc. The switching period Ts is fixed.

The processing executed by CPU of the charging switch controller 90 will be described with reference to the flowchart of FIG. 3.

Figure 3:
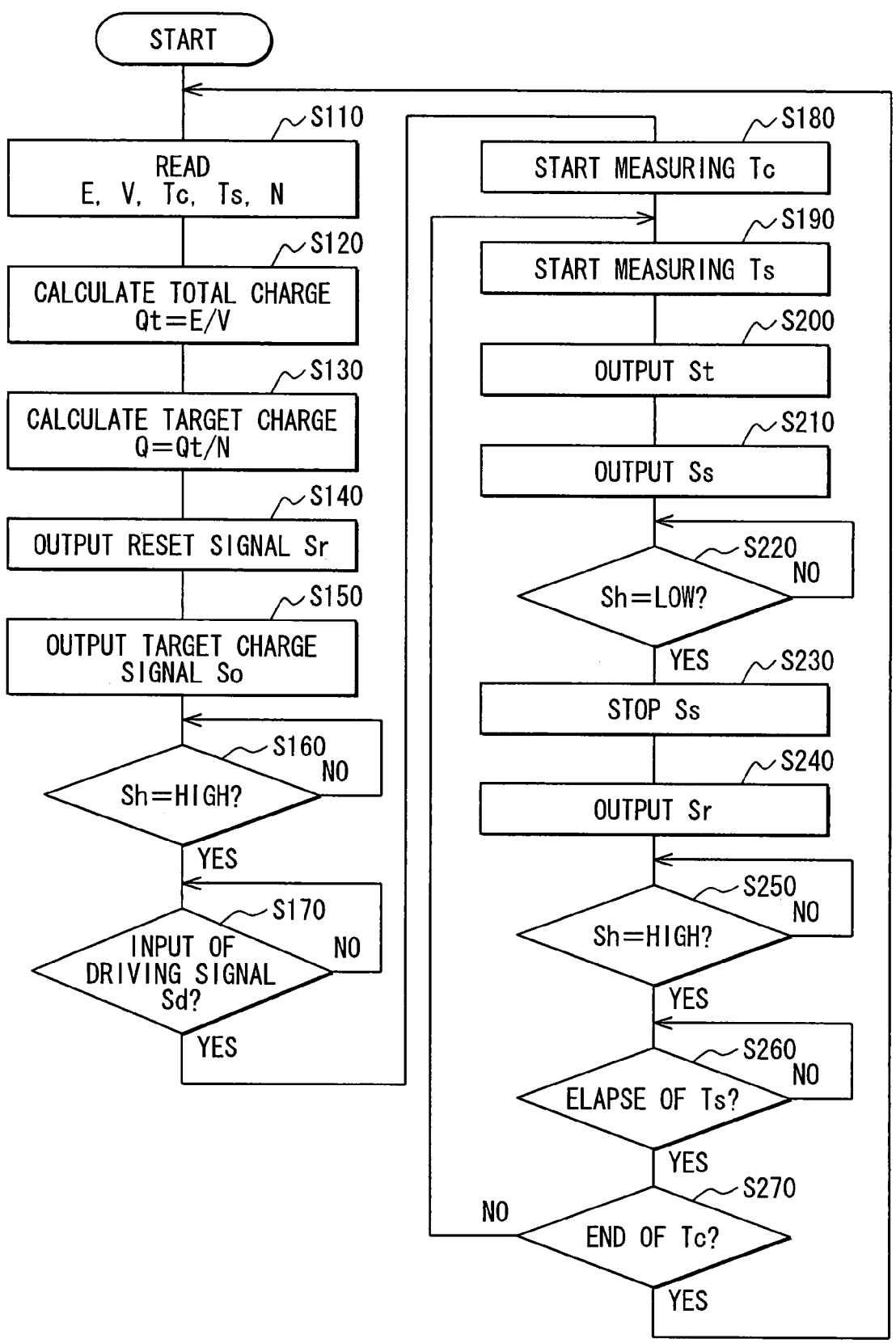
FIG. 3 is a flowchart showing the processing executed by CPU of a charging switch controller of the driving device according to the first embodiment.

When CPU of the charging switch controller 90 is started upon turn-on of an ignition switch of a vehicle, as shown in FIG. 3, the energy instruction value E, the charging period Tc, the switching period Ts and the switching frequency N are first read in from ROM in S110, and also the voltage value V of the buffer capacitor C1 is acquired from the boosting control circuit 18.

Subsequently, in S120, the energy instruction value E is divided by the voltage value V to calculate the total charge amount Qt to be discharged from the buffer capacitor C1 within the charging period Tc (Qt=E/V). Then, in S130, the total charge amount Qt calculated in S120 is divided by the switching frequency N, thereby calculating a target charge amount Q to be discharged from the buffer capacitor C1 during one ON-period of the charging switch SW1 (Q=Qt/N). In S140, an integration reset signal Sr for turning on the integration reset switch SW4 is output for a predetermined time. Subsequently, in S150, a target charge amount setting signal So representing the target charge amount Q calculated in S130 is output to the non-inverting input terminal (+) of the determining circuit 80 (the comparator CMP1).

Subsequently, it is checked in S160 whether the signal level of the determination signal Sh is high (Sh=high) or not. If it is determined in S160 that the signal level of the determination signal Sh is not high, the processing of S160 is repetitively executed, and the processing proceeds to S170 if it is determined that the signal level of the determination signal Sh is high.

It is checked in S170 whether the driving signal Sd is input or not. If it is determined in S170 that no driving signal Sd is input, the processing of S170 is repetitively executed. Conversely, if it is determined that the driving signal Sd is input, the processing proceeds to S180.

In S180, the measurement of the charging period Tc is started, and also a cylinder selecting switching signal is output to the gate of the cylinder selecting switch (SWa to SWd) which is specified by the driving signal Sd so that the specified cylinder selecting switch (SWa to SWd) is turned on.

Then, in the subsequent step S190, the measurement of the switching period Ts is started. Subsequently, in S200, a switching period St representing the timing at which the charging switch SW1 should be turned on is output for a predetermined time.

In S210, a charging switching signal Ss for turning on the charging switch SW1 is output to the gate of the charging switch SW1. Then, it is checked in S220 whether the signal level of the determination signal Sh is low or not.

If it is determined in S220 that the signal level of the determination signal Sh is not low, the processing of S220 is repetitively executed. Conversely, if it is determined that the signal level of the determination signal Sh is low, the processing proceeds to S230.

In S230, the output of the charging switch Ss is stopped, and in the subsequent step S240, the integration reset signal Sr is output for a predetermined time. Then, in S250, it is checked whether the signal level of the determination signal Sh is high or not.

If it is determined in S250 that the signal level of the determination signal Sh is not high, the processing of S250 is repetitively executed. Conversely, if it is determined that the signal level of the determination signal Sh is high, the processing proceeds to S260.

In S260, it is checked whether the switching period Ts has elapsed from the start of the measurement of the switching period Ts in S190. If it is determined in S260 that the switching period Ts has not yet elapsed, the processing of S260 is repetitively executed. Conversely, if it is determined that the switching period Ts has elapsed, the processing proceeds to S270.

In S270, it is checked whether the charging period Tc has elapsed (been finished) from the start of the measurement of the charging period Tc in S180. If it is determined in S270 that the charging period Tc has not yet been finished, the processing proceeds to S190. Conversely, if it is determined that the charging period Tc has been finished, the output of the cylinder selecting switching signal is stopped, and the processing proceeds to S110.

Next, the operation of each part when the driving device 1 charges the piezoelectric actuators P1 to P4 will be described with reference to FIG. 4. All the piezoelectric actuators P1 to P4 execute substantially the same operation, and thus the piezoelectric actuator P1 will be representatively described in the following description.

Figure 4:
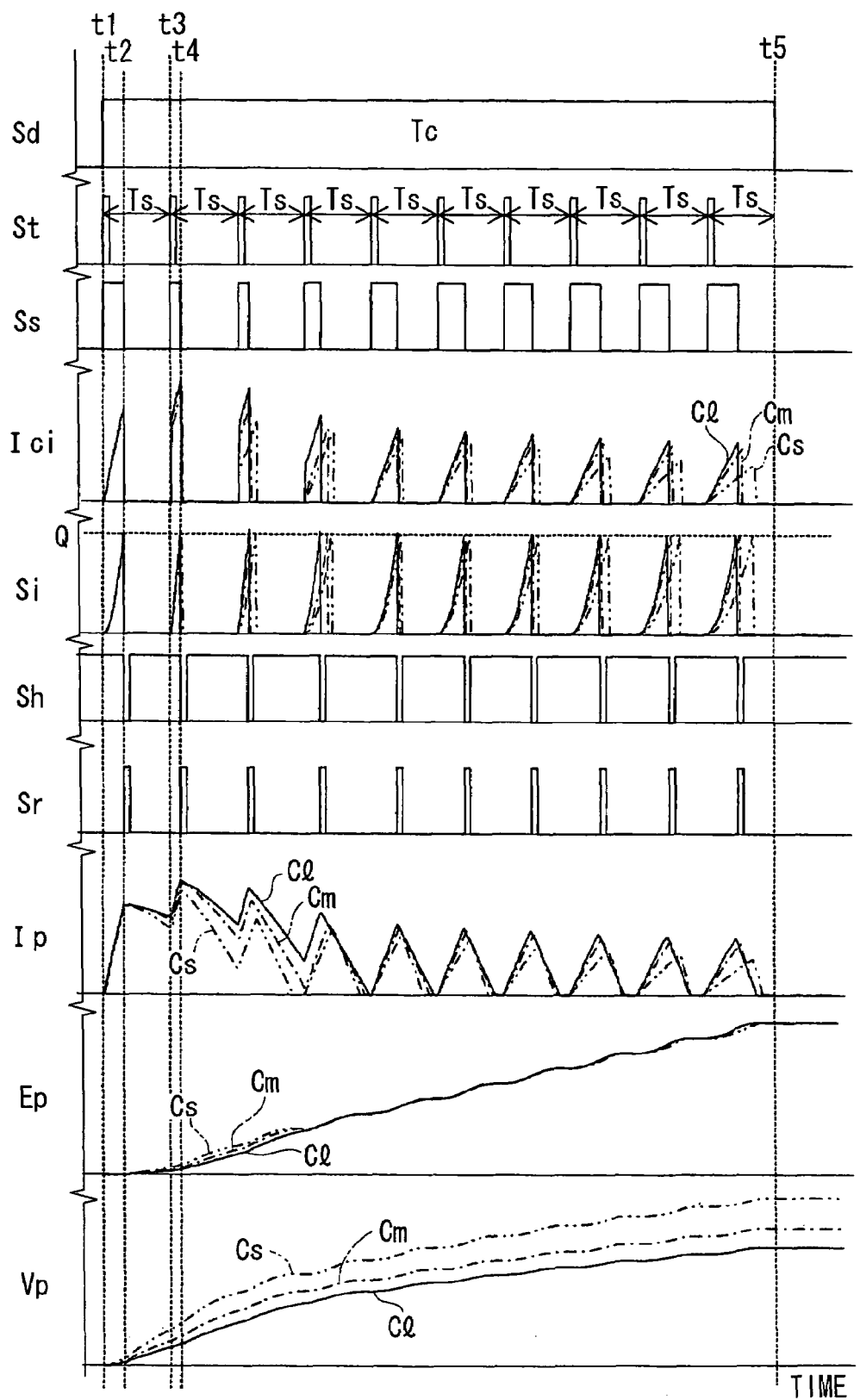
FIG. 4 is a time chart showing the operation of each part in a charging operation in the driving device according to the first embodiment.
Figure 5:
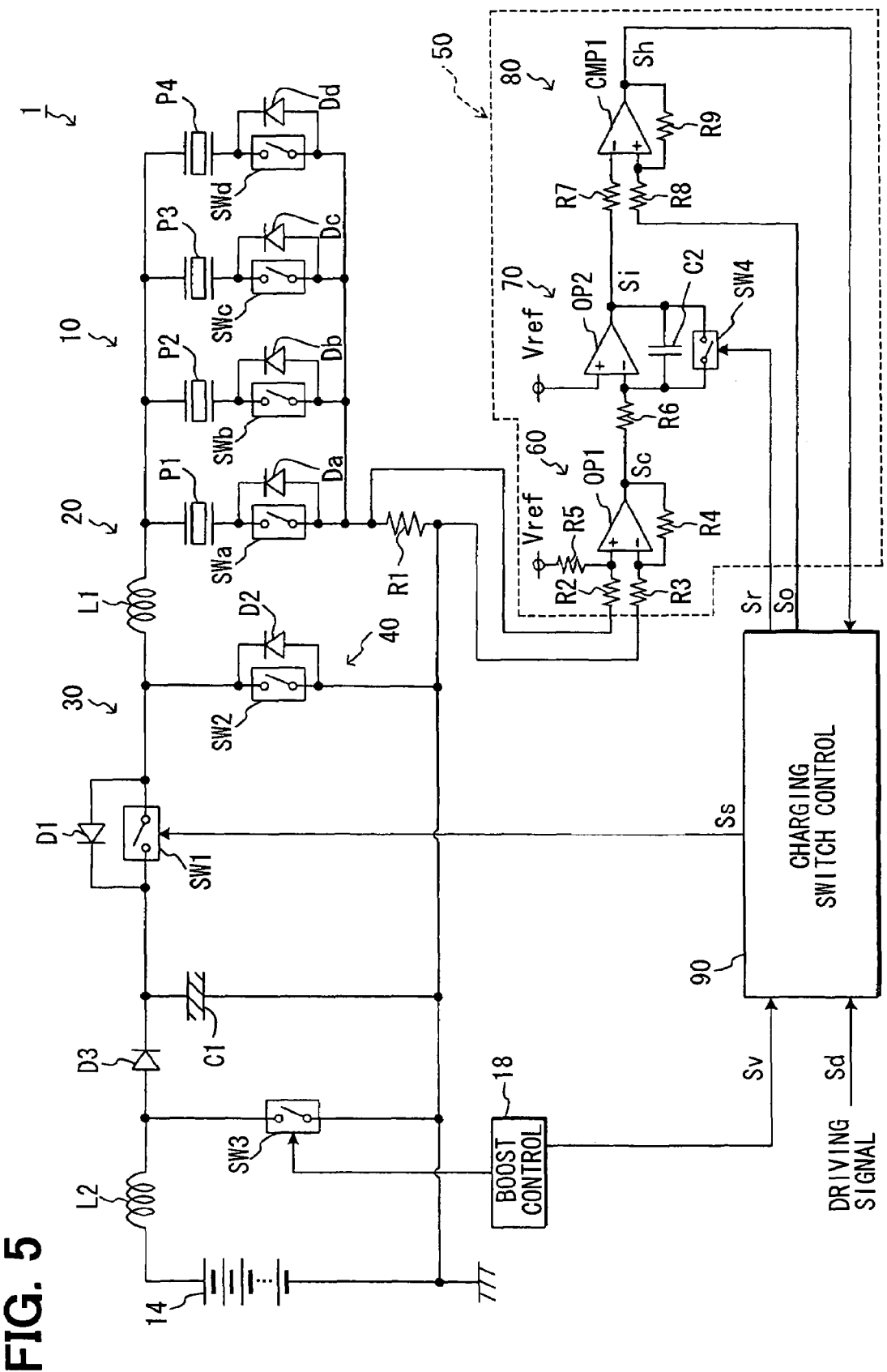
FIG. 5 is a circuit diagram showing a driving device according to a second embodiment of the present invention.

As shown in FIG. 4, in the driving device 1, when the driving signal Sd is input to the switch controller 50 at time ti (S170: YES), the switching period signal St and the charging switching signal Ss are output (S200, S210), and also the cylinder selecting switching signal is output to the cylinder selecting switch SWa.

In this case, the charging switch SW1 is turned on to make the charging circuit 30 conductive, so that buffer capacitor current Ic1 flows from the buffer capacitor C1 through the charging circuit 30 to the piezoelectric actuator P1.

The buffer capacitor current Ic1 gradually increases on the basis of the time constant determined by the inductor L1 and the capacitance of the piezoelectric actuator P1, and thus the charge amount represented by the integration signal Si also increases.

When at time t2 the charge amount represented by the integration signal Si reaches the target charge amount Q (the value acquired by adding the target charge amount Q with the amount corresponding to the hysteresis), the output level of the determination signal Sh is switched to low level (S220: YES), and the output of the charging switching signal Ss is stopped (S230).

At this time, the charging switch SW1 is turned off to block the charging circuit 30, and a flywheel current flows to the piezoelectric actuator P1 through the parasitic diode D2 by the energy accumulated through the inductor L1.

Then, the flywheel current is gradually reduced through the discharge of the energy accumulated in the inductor L1.

Furthermore, at the time t2, the charging switch controller 90 outputs the integration reset signal Sr for a predetermined time, so that the integration reset switch SW4 is turned on and the charges accumulated in the capacitor C2 is discharged (that is, the integration signal Si is reset).

When the switching period signal St is output again at time t3 at which the fixed switching period Ts has elapsed from the time t1, the same operation as the time t1 is performed. When the charge amount represented by the integration time Si reaches the target charge amount Q at time t4, the same operation as the time t2 is performed.

The operation that the charging switch SW1 is turned on at the period corresponding to each switching period Ts and the charging switch SW1 is turned off every time the integration signal Si reaches the target charge amount Q is repeated until a time t5 at which the charging period Tc has elapsed from the time t1.

One-dotted chain line of FIG. 4 represents a case where in place of the piezoelectric actuators P1 to P4, piezoelectric actuators having a medium capacitance Cm smaller than the electrostatic capacitance (large capacitance Cl represented by a solid line) of the piezoelectric actuators P1 to P4 are used as driving targets in the driving device 1. Two-dotted chain line of FIG. 4 represents a case where piezoelectric actuators having further smaller electrostatic capacitance Cs than the electrostatic capacitance of the piezoelectric actuators used in the case indicated by the one-dotted chain line of FIG. 4 are used as driving targets in the driving device 1.

That is, in FIG. 4, the case where the piezoelectric actuators P1 to P4 having large-level electrostatic capacitance Cl are used in the driving device 1 is represented by the solid line, the case where the piezoelectric actuators P1 to P4 having medium electrostatic capacitance Cm are used in the driving device is represented by one-dotted chain line, and the case where the piezoelectric actuators P1 to P4 having small-level electrostatic capacitance Cs are used in the driving device is represented by two-dotted chain line.

In FIG. 4, the signals Ss, Sh, Sr when the electrostatic capacitance of the piezoelectric actuators P1 to P4 is in the medium level and in the small level are omitted from the illustration because the time chart of FIG. 4 would be difficult to be visually understood if all the signals are illustrated.

Even when the piezoelectric actuators P1 to P4 which are different in electrostatic capacitance from one another are used, the output start timing of the charging period signal St is not varied. Therefore, with respect to the signals Ss, Sh, Sr when the electrostatic capacitance is in the medium level or small level, the output stop timing of the charging switching signal Ss and the variation patterns of the signals Sh, Sr are delayed as compared with those when the electrostatic capacitance is in the large level, as in the case of the buffer capacitance current Ic1 and the variation pattern of the integration signal Si.

As described above, in the driving device 1, during the charging period Tc from the time at which the driving signal Sd is input till the time when the driving signal Sd is not input, when the driving signal Sd is input, the charging switch SW1 is turned on at a fixed period, and also the charging switch SW1 is turned off every time the charge amount represented by the integration signal Si reaches the target charge amount Q.

Therefore, according to the driving device 1, the switching period Ts when the charging switch SW1 is turned on during the charging period Tc is fixed, and the charge energy in one turn-on operation of the charging switch SW1 can be also fixed irrespective of temperature variation. Therefore, the expansion rate of the piezoelectric actuators P1 to P4 (that is, the expanding behavior of the piezoelectric actuators P1 to P4 through one charging operation) during the charging period Tc can be set to a desired expansion rate.

Accordingly, even when the electrostatic capacitance of the piezoelectric actuators P1 to P4 is varied like Cl, Cm, Cs due to temperature variation or the like and, as a result, the piezoelectric actuator current Ip, the charge energy Ep and the piezoelectric actuator voltage Vp vary as shown in FIG. 4, the expansion rate of the piezoelectric actuators P1 to P4 can be prevented from being varied.

Furthermore, according to the driving device 1, the timing of the fuel injection of the injector can be prevented from being varied due to the variation of the electrostatic capacitance.

Still furthermore, if the integration value of the buffer capacitor current Ic1 flowing from the buffer capacitor C1 to the piezoelectric actuators P1 to P4 is calculated, the charge energy Ep to be charged in the piezoelectric actuators P1 to P4 per unit time can be derived. Therefore, in the driving device 1 of the first embodiment, when the integration signal Si reaches the target charge amount Q, the charging switch SW1 is turned off.

Therefore, the charge energy Ep can be estimated by merely deriving the integration value of the buffer capacitor current Ic1, and thus the construction of the driving device 1 can be simplified.

Furthermore, according to the driving device 1, the target value Q is determined on the basis of the voltage value of the buffer capacitor C1 and the energy instruction value E, and thus the expansion rate of the piezoelectric actuators P1 to P4 can be set to be identical even when the voltage value V of the buffer capacitor C1 varies.

In the first embodiment, the power supply circuit 12 operates as a DC power source, the parasitic diode D1 operates as a first diode, and the parasitic diode D2 operates as a second diode. The input of the driving signal Sd is a driving instruction, and the stop of the driving signal Sd is a driving stop instruction. The switch controller 50 operates as a charge/discharge control section, the current detecting resistor R1 operates as a current detecting section, the current integration circuit 70 operates as an estimating section, and the processing of S170 to S270 operates as a charge switch driving section. The processing of S120 and S130 operates as a target value setting section.

Second Embodiment

The driving device 1 of the second embodiment is different from the first embodiment in the connecting position of the current detecting resistor R1 and the stop timing of the output of the integration reset signal Sr.

Specifically, the current detecting resistor R1 is connected between the end portion of the parallel circuit 10 at the cylinder selecting switch (SWa to SWd) side and the ground line.

In such a case, not only the buffer capacitor current, but also the flywheel current flowing at the turn-off time of the charging switch SW1 in the charging period Tc flow through the current detecting resistor R1, and thus the current integration circuit 70 integrates not only the buffer capacitor current, but also the flywheel current.

Figure 6:
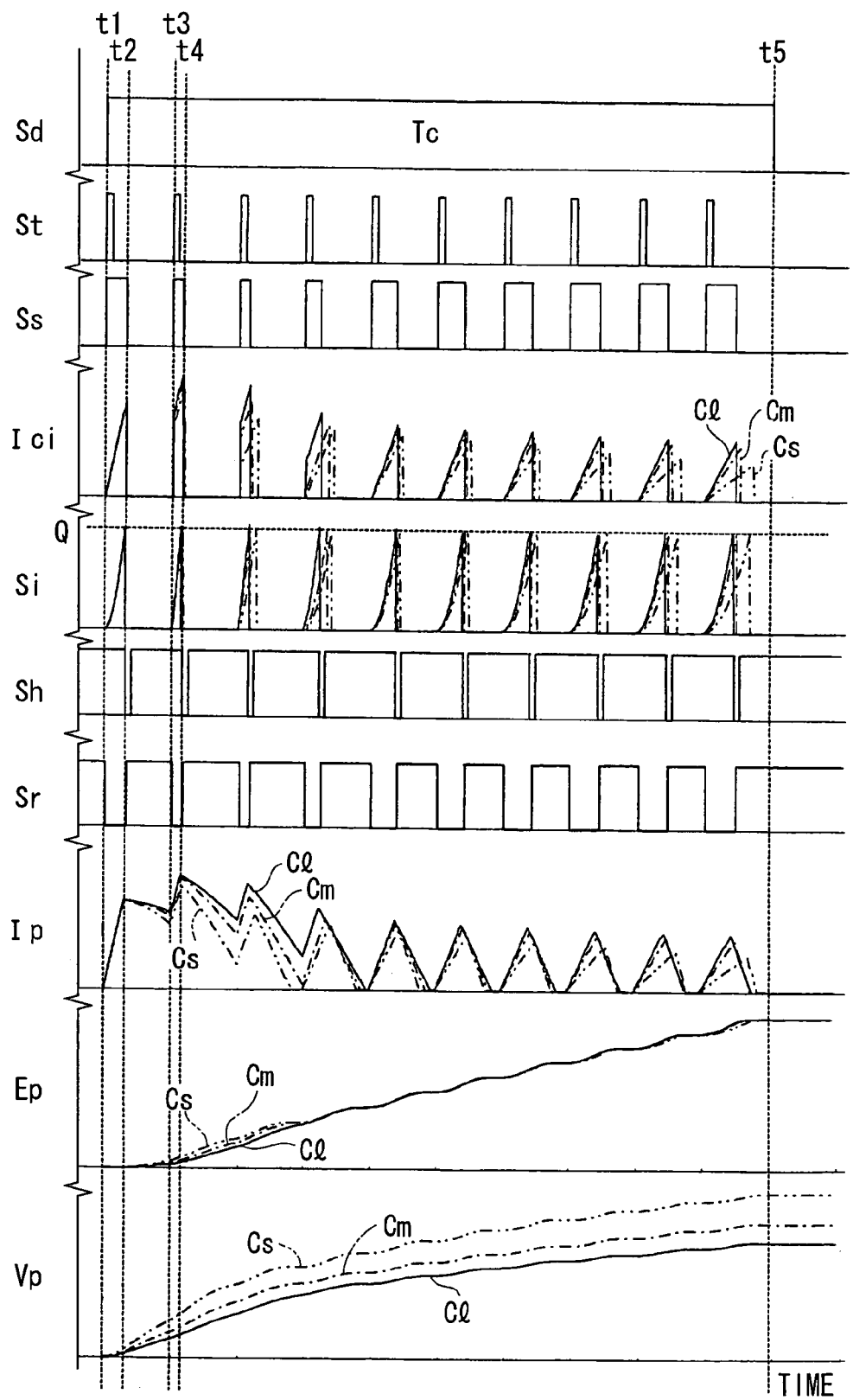
FIG. 6 is a time chart showing the operation of each part in the charging operation in the driving device according to the second embodiment.

Therefore, according to the second embodiment, in order to prevent the flywheel current from being integrated, the output stop timing of the integration reset signal Sr is set to the time when the switching period signal St is next output, at time t3 for example, as shown in FIG. 6.

Specifically, the output of the integration reset signal Sr is stopped when the charging switch controller 90 finishes the processing of S200.

According to the driving device 1 of the second embodiment, irrespective of the temperature variation, the charge energy in one turn-on operation of the charging switch SW1 can be fixed while the switching period Ts when the charging switch SW1 is turned on is fixed, and thus the same advantage as the first embodiment can be acquired.

Third Embodiment

The driving device of the third embodiment is different from the driving device 1 of the first embodiment so that the target charge amount Q is not fixed among the switching periods Ts in the charging period Tc. In this case, the target charge amount Q1 in the first ON-period of the charging switch SW1 is smaller than the target charge amount Q of the second and subsequent ON-periods.

That is, the target charge amount Q1 is stored in ROM of the charging switch controller 90, and the charging switch controller 90 calculates the target charge amount Q of the second and subsequent ON-periods of the charging switch SW1 on the basis of the target charge amount Q1 and the total charge amount Qt.

The charging switch controller 90 controls the turn-off of the charging switch SW1 by using the target charge amount Q1 in the first ON-period of the charging switch SW1, and also controls the turn-off of the charging switch SW1 by using the target charge amount Q larger than the target charge amount Q1 in the second and subsequent ON-periods of the charging switch SW1.

Figure 7:
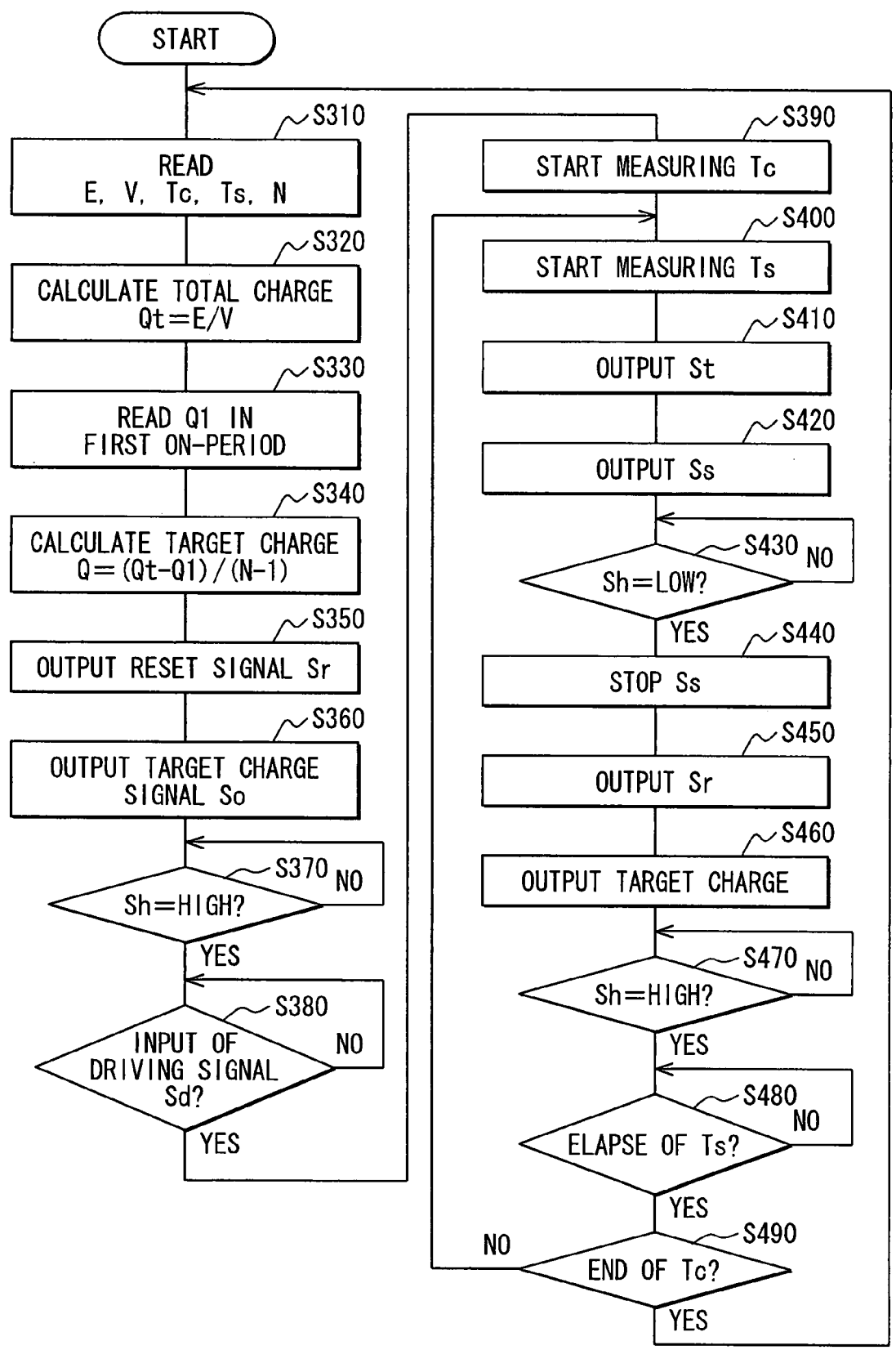
FIG. 7 is a flowchart showing the processing executed by CPU of a charging switch controller of a driving device according to a third embodiment of the present invention.

Next, the processing executed by the charging switch controller 90 of the driving device of the third embodiment will be described with reference to FIG. 7.

When the charging switch controller of the driving device of the third embodiment starts the processing, the energy instruction value E, the charging period Tc, the switching period Ts and the switching frequency N are first read from ROM in S310, and also the voltage value V of the buffer capacitor C1 is acquired from the boosting control circuit 18.

Subsequently, in S320, the energy instruction value E is divided by the voltage value V to calculate the total charge amount Qt (Qt=E/V). In S330, the target charge amount Q1 in the first ON-period of the charging switch SW1 is read from ROM. Subsequently, in S340, as is apparent from the following equation (1), the value (Qt−Q1) acquired by subtracting the target charge amount Q1 from the total charge amount Qt is divided by the value (N−1) acquired by subtracting 1 from the switching frequency N, thereby calculating the target charge value Q in each of the second and subsequent ON-periods of the charging switch SW1.

$$Q=(Qt-Q1)/(N-1) \qquad (1)$$

In S350, the integration reset signal Sr is output for a predetermined time. Subsequently, in S360, a target charge amount signal So representing the target charge amount Q1 in the first ON-period of the charging switching Sw1 is output.

Subsequently, it is checked in S370 whether the signal level of the determination signal Sh is high or not. If it is determined in S370 that the signal level of the determination signal Sh is not high, the processing of S370 is repetitively executed. Conversely, if it is determined in S370 that the signal level of the determination signal Sh is high, the processing proceeds to S380.

In S380, it is checked whether the driving signal Sd is input or not. Then, if it is determined in S380 that no driving signal Sd is input, the processing of S380 is repetitively executed. Conversely, if it is determined that the driving signal Sd is input, the processing proceeds to S390. In S390, the measurement of the charging period Ts is started, and the cylinder selecting switching signal is output. In the subsequent S400, the measurement of the switching period Ts is started. Subsequently, in S410, the switching period signal St is output for a predetermined time, and in the subsequent S420, the charging switching signal Ss is output.

Subsequently, in S430, it is checked whether the signal level of the determination signal Sh is low or not. Then, if it is determined in S430 that the signal level of the determination signal Sh is not low, the processing of S430 is repetitively executed. Conversely, if it is determined in S430 that the signal level of the determination signal Sh is low, the processing proceeds to S440.

In S440, the output of the charging switching signal Ss is stopped, and in the subsequent S450, the integration reset signal Sr is output for a predetermined time. Then, in S460, the target charge amount setting signal So representing the target charge amount Q in each of the second and subsequent ON-periods of the charging switch SW1 is output.

In S470, it is checked whether the signal level of the determination signal Sh is high or not. If it is determined in S470 that the signal level of the determination signal Sh is not high, the processing of S470 is repetitively executed. Conversely, if it is determined in S470 that the signal level of the determination signal Sh is high, the processing proceeds to S480.

In S480, it is checked whether the switching period Ts has elapsed or not from the time when the measurement of the switching period Ts is started in S400. If it is determined in S480 that the switching period Ts has not yet elapsed, the processing of S480 is repetitively executed. Conversely, if it is determined in S480 that the switching period has elapsed, the processing proceeds to S490.

In S490, it is checked whether the charging period Tc has elapsed (finished) or not from the time when the measurement of the charging period Tc is started in S390. If it is determined in S490 that the charging period Tc has not yet elapsed, the processing returns to S400. Conversely, if it is determined in S490 that the charging period Tc has elapsed (finished), the output of the cylinder selecting switching signal is stopped, and the processing proceeds to S310.

Next, the operation of each part when the driving device of the third embodiment charges the piezoelectric actuators P1 to P4 will be described with reference to FIG. 8.

Figure 8:
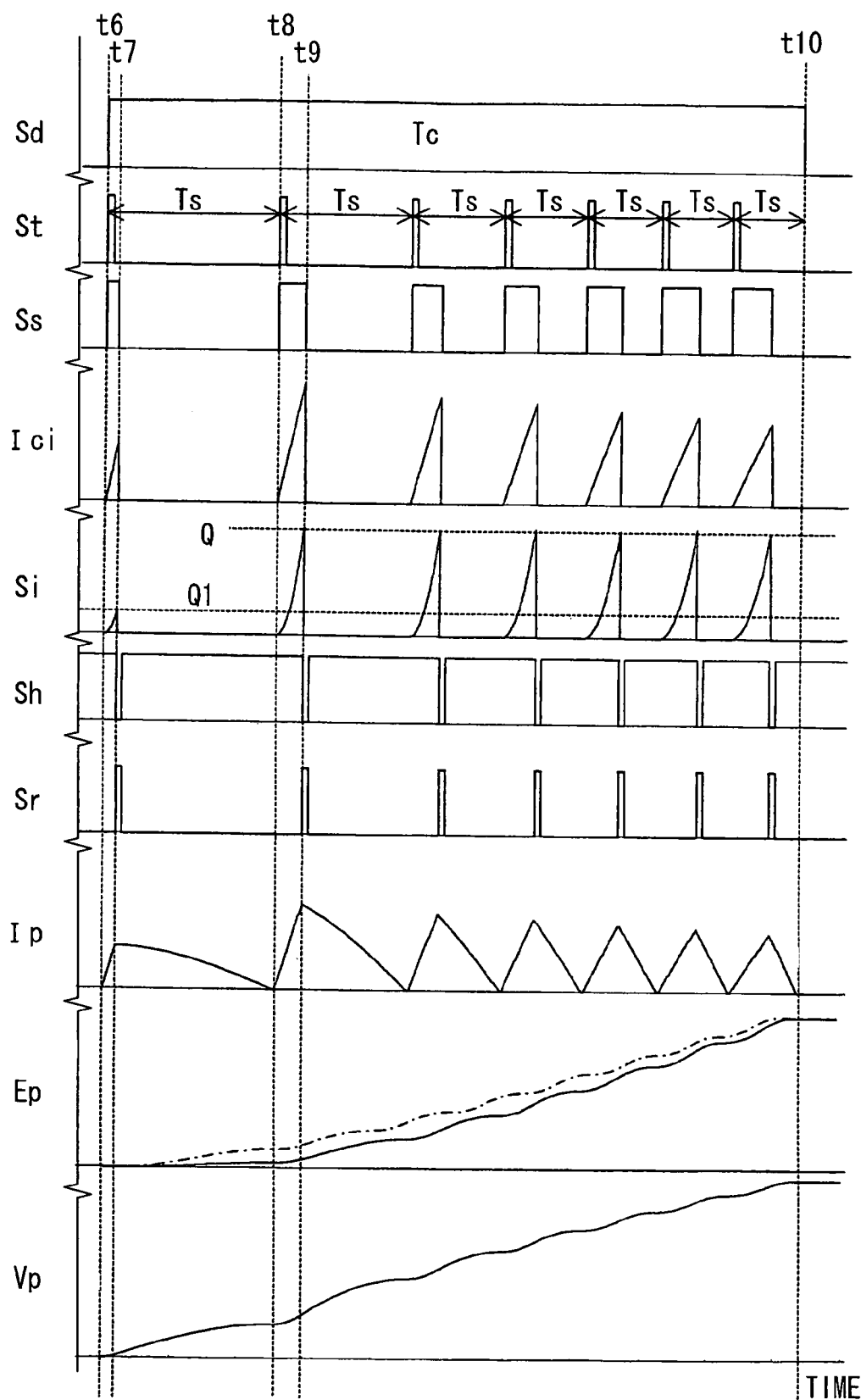
FIG. 8 is a time chart showing the operation of each part in the charging operation in the driving device of the third embodiment.

In the driving device of the third embodiment, first, the target charge amount Q1 is input to the non-inverting input terminal (+) of the determining circuit 80 (S360), and when the driving signal Sd is input to the switch controller 50 at time t6 as shown in FIG. 8 (S380: YES), the switching period signal St and the charging switching signal Ss are output (S410, S420), and the cylinder selecting switching signal is output to the cylinder selecting switch SWa.

As described above, the buffer capacitor current flows from the buffer capacitor C1 through the charging circuit 30 to the piezoelectric actuator P1. Then, when at time t7 the charge amount represented by the integration signal Si reaches the target charge amount Q1, the output level of the determination signal Sh is switched to low (S430: YES), the output of the charging switch signal Ss is stopped (S440).

At this time, the flywheel current flows through the parasitic diode D2 into the piezoelectric actuator P1 as described above. Furthermore, at time t7, the charging switching controller 90 outputs the integration reset signal Sr for a predetermined time, and the target charge amount Q larger than the target charge amount Q1 is input to the non-inverting input terminal (+) of the determining circuit 80 (S460).

Then, when the switching period signal St is input again at time t8, the same operation as the time t6 is carried out, and when the charge amount represented by the integration signal Si reaches the target charge amount Q at time t9, the same operation as the time t7 is carried out.

Thereafter, the operation of turning on the charging switch SW1 every switching period Ts and also turning off the charging switch SW1 every time the integration signal Si reaches the target charge amount Q is repeated until a time t10.

According to the driving device of the third embodiment described above, the switching period Ts when the charging switch SW1 is turned on in the charging period Tc is fixed, and the charge energy in the first turn-on operation of the charging switch SW1 can be fixed irrespective of temperature variation, so that the same advantage as the first embodiment can be acquired.

Furthermore, in the driving device of the third embodiment, the target charge amount every switching period Ts in the charging period Tc is set so that the target charge amount Q1 in the first ON-period of the charging switch SW1 is smaller than the target charge amount Q of each of the second and subsequent ON-periods. Therefore, the charging energy to be accumulated into the piezoelectric actuators P1 to P4 at the charging start time (first ON-period of the charging switch SW1) can be reduced to be less than the charging energy when the target charge amount Q of each switching period Ts is set to be identical among the respective switching periods Ts (one-dotted chain line of FIG. 8).

Therefore, the load imposed on the piezoelectric actuators P1 to P4 at the charging start time can be reduced, and thus the lifetime and reliability of the piezoelectric actuators can be enhanced. In addition, occurrence of operating sounds can be suppressed.

In the driving device of the third embodiment, the switching period Ts is set so as to become shorter every time the charging switch SW1 is turned on. However, the switching period Ts may be set to be fixed as in the case of the first and second embodiments.

Furthermore, the target charge amount Q1 in the first ON-period of the charging switch SW1 may be set to any value insofar as it is smaller than the target charge amount Q in the second and subsequent ON-periods.

In the third embodiment, the target charge amount Q1 in the first ON-period of the charging switch SW1 is stored in ROM. However, the target charge amount Q1 may be set and changed by the user or the like.

Fourth Embodiment

Next, a driving device according to a fourth embodiment will be described with reference to FIGS. 9 and 10.

The driving device of the fourth embodiment is different from the driving device 1 of the first embodiment in that the switching period Ts is not fixed, but it is set to be shorter every time the charging switch SW1 is once turned on.

Specifically, the switching period Ts(n) of the fourth embodiment is set on the basis of a value which is acquired by an experiment or the like in advance so that no flywheel has been already prevented from flowing in the discharge circuit 40 at the output time of the switching period signal St (the turn-on time of the charging switch SW1) even when the electrostatic capacitance of the piezoelectric actuators P1 to P4 varies).

In the case where the piezoelectric actuators P1 to P4 having large electrostatic capacitance are used in the driving device, the period at which the flywheel current flows in the discharge circuit 40 during charging operation is measured by the experiment or the like in advance, and the switching period Ts(n) is set on the basis of the measurement result.

The processing executed by the charging switch controller 90 of the driving device according to the fourth embodiment will be described hereunder with reference to FIG. 9.

Figure 9:
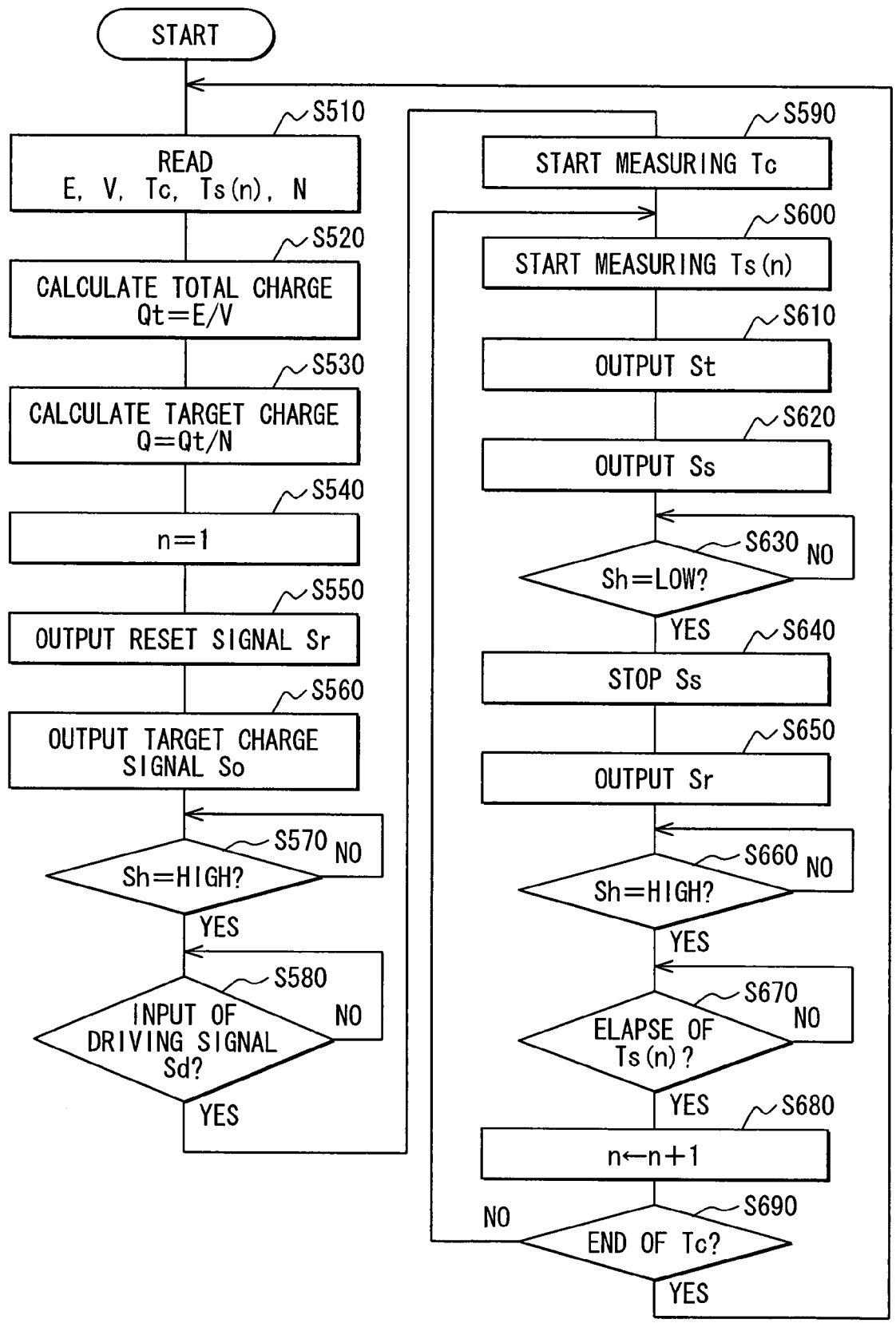
FIG. 9 is a flowchart showing the processing executed by CPU of a charging switch controller of a driving device according to a fourth embodiment of the present invention.

When the charging switch controller 90 of the driving device starts the processing of FIG. 9, in S510, the energy instruction value E, the charging period Tc, the switching period Ts(n) and the switching frequency N are read from ROM, and also the voltage V of the buffer capacitor C1 is acquired from the boosting control circuit 18.

Subsequently, in S520, the energy instruction value E is divided by the voltage value V to calculate the total charge amount Qt (Qt+E/V). In S530, the total charge amount Qt calculated in S120 is divided by the switching frequency N to calculate the target charge amount (Q=Qt/N). Subsequently, in S540, n is set to 1. Then, in S550, the integration reset signal Sr is output for a predetermined time. In the subsequent S560, the target charge amount setting signal So representing the target charge amount Q is output.

Subsequently, in S570, it is checked whether the signal level of the determination signal Sh is high or not. If it is determined in S570 that the signal level of the determination signal Sh is not high, the processing of S570 is repetitively executed. Conversely, if it is determined in S570 that the signal level of the determination signal Sh is high, the processing proceeds to S580.

In S580, it is checked whether the driving signal Sd is input. If it is determined in S580 that no driving signal Sd is input, the processing of S580 is repetitively executed. Conversely, if it is determined in S580 that the driving signal Sd is input, the processing proceeds to S590.

In S590, the measurement of the charging period Tc is started, and the cylinder selecting switching signal is output. Then, in S600, the measurement of the switching period Ts(n) is started. Subsequently, in S610, the switching period signal St is output a predetermined time, and in the subsequent S620, the charging switching signal Ss is output. Subsequently, it is checked in S630 whether the signal level of the determination signal Sh is low or not.

If it is determined in S630 that the signal level of the determination signal Sh is not low, the processing of S630 is repetitively executed. Conversely, if it is determined in S630 that the signal level of the determination signal is low, the processing proceeds to S640.

In S640, the output of the charging switching signal Ss is stopped, and in the subsequent S650, the integration reset signal Sr is output for a predetermined time. Then, it is checked in S660 whether the signal level of the determination signal Sh is high or not.

If it is determined in S660 that the signal level of the determination signal Sh is not high, the processing of S660 is repetitively executed. Conversely, if it is determined in S660 that the signal level of the determination signal Sh is high, the processing proceeds to S670.

In S670, it is checked whether the switching period Ts(n) has elapsed from the start time of the measurement of the switching period Ts(n) in S600. If it is determined in S670 that the switching period Ts(n) has not yet elapsed, the processing of S670 is repetitively executed. Conversely, if it is determined that the switching period Ts(n) has elapsed, the processing proceeds to S680.

In S680, n is incremented by adding 1 to n. Then, it is determined in S690 whether the charging period Tc has elapsed (finished) from the time when the measurement of the charging period Tc is started in S590.

If it is determined in S590 that the charging period Tc has not finished, the processing proceeds to S600. Conversely, if it is determined in S590 that the charging period Tc has finished, the output of the cylinder selecting switching signal is stopped, and the processing proceeds to S510.

As described above, according to the driving device of the fourth embodiment, irrespective of the temperature variation, the charge energy in one turn-on operation of the charging switch SW1 can be also fixed while the switching period Ts at the ON-time of the charging switch SW1 in the charging period Tc is fixed. Therefore, the same advantage as the first embodiment can be acquired. Accordingly, as compared with the first embodiment, the expansion rate of the piezoelectric actuators P1 to P4 can be more efficiently suppressed from being varied due to variation of the electrostatic capacitance.

In the first embodiment, the charging switch SW1 is turned on during charging operation before flow of the flywheel current is stopped. Therefore, all the energy accumulated in the inductor L1 is not necessarily discharged, and thus a residual amount of energy is carried over to the next operation. Therefore, when the electrostatic capacitance of the piezoelectric actuators P1 to P4 varies, the energy to be carried over is also varied. Accordingly, the charge amount every OFF-period of the charging switch SW1 is varied, and the expansion rate every electrostatic capacitance is slightly dispersed.

Figure 10:
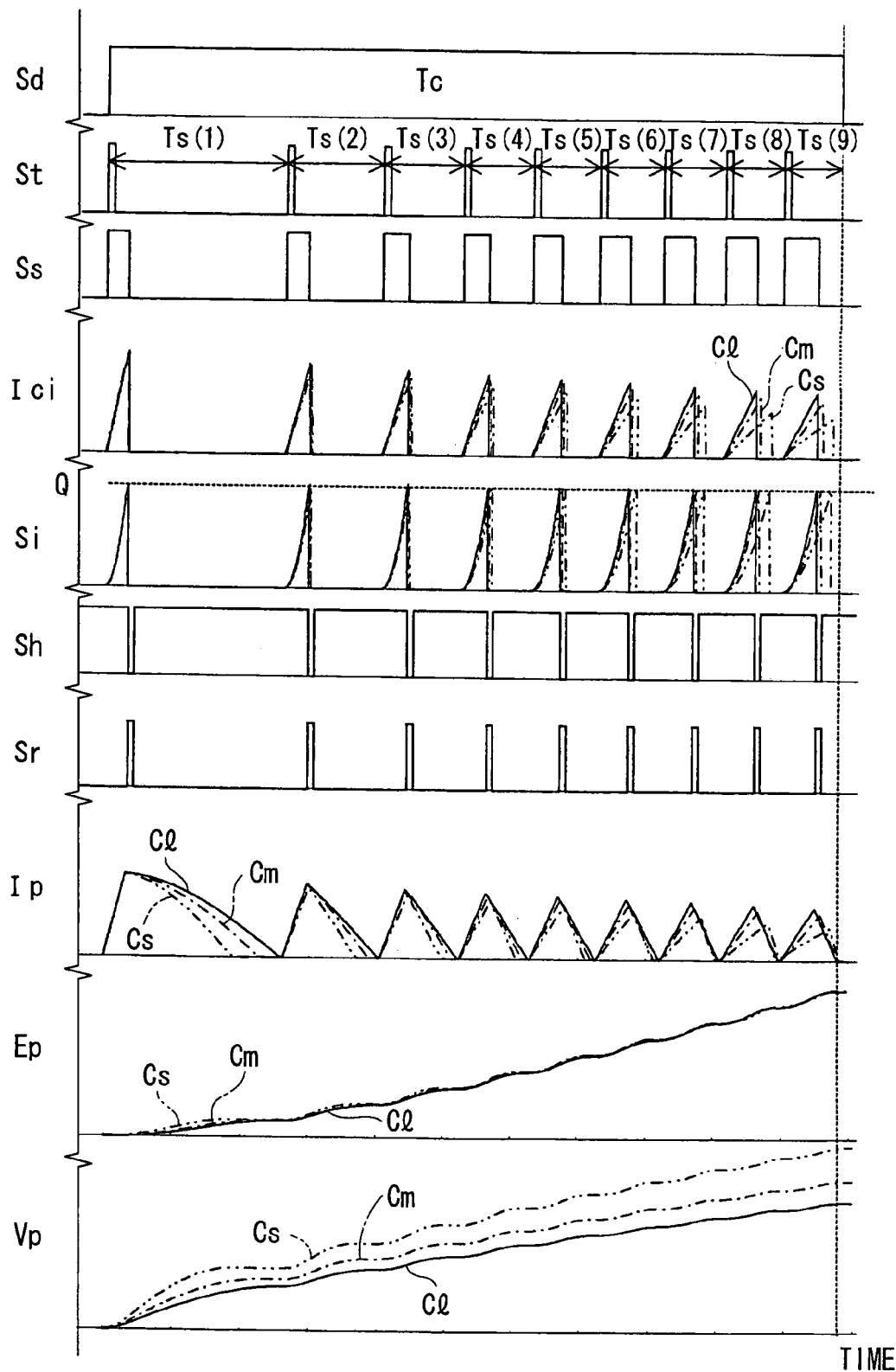
FIG. 10 is a time chart showing the operation of each part in the charging operation in the driving device according to the fourth embodiment.

On the other hand, in the driving device according to the fourth embodiment, as shown in FIG. 10, the switching period Ts(n) is set so that no flywheel current has been already prevented from flowing to the discharge circuit 40 at the output time of the switching period signal St even when the electrostatic capacitance varies.

Therefore, when charging switch SW1 is next turned on, all the energy accumulated in the inductor L1 is discharged, so that the charge amount can be suppressed from being varied every OFF-period of the charging switch SW1 due to variation of the electrostatic capacitance of the piezoelectric actuators P1 to P4.

Accordingly, according to the fourth embodiment, the variation of the expansion rate of the piezoelectric actuators P1 to P4 due to the variation of the electrostatic capacitance can be more efficiently suppressed as compared with the first embodiment.

Furthermore, according to the fourth embodiment, since the switching period Ts(n) is set so that flywheel current has been already prevented from flowing to the discharge circuit 40 at the time when the switching period signal St is output, current (through current) is prevented from flowing in the opposite direction flows to the parasitic diode D2 of the discharge switch SW2 at the time when the charging switch SW1 is turned on. Accordingly, occurrence of noise and loss can be suppressed.

Fifth Embodiment

As compared with the driving device of the fourth embodiment, according to the driving device according to the fifth embodiment, when the electrostatic capacitance of the piezoelectric actuators P1 to P4 is small, a period at which the flow of flywheel current to the discharging circuit 40 is stopped in the charging operation is measured by an experiment or the like. The switching period Ts(n) is set on the basis of the measurement result.

That is, in the fourth embodiment, the switching period Ts(n) is set on the basis of the case where the electrostatic capacitance of the piezoelectric actuators P1 to P4 is large. However, in the fifth embodiment, the switching period Ts(n) is set on the basis of the case where the electrostatic capacitance of the piezoelectric actuators P1 to P4 is small.

Therefore, according to the driving device of the fifth embodiment, irrespective of the temperature variation, the charge energy in one turn-on operation of the charging switch SW1 can be also fixed while the switching period Ts at the ON-time of the charging switch SW1 in the charging period Tc is fixed. Therefore, the same advantage as the first embodiment can be acquired.

Figure 11:
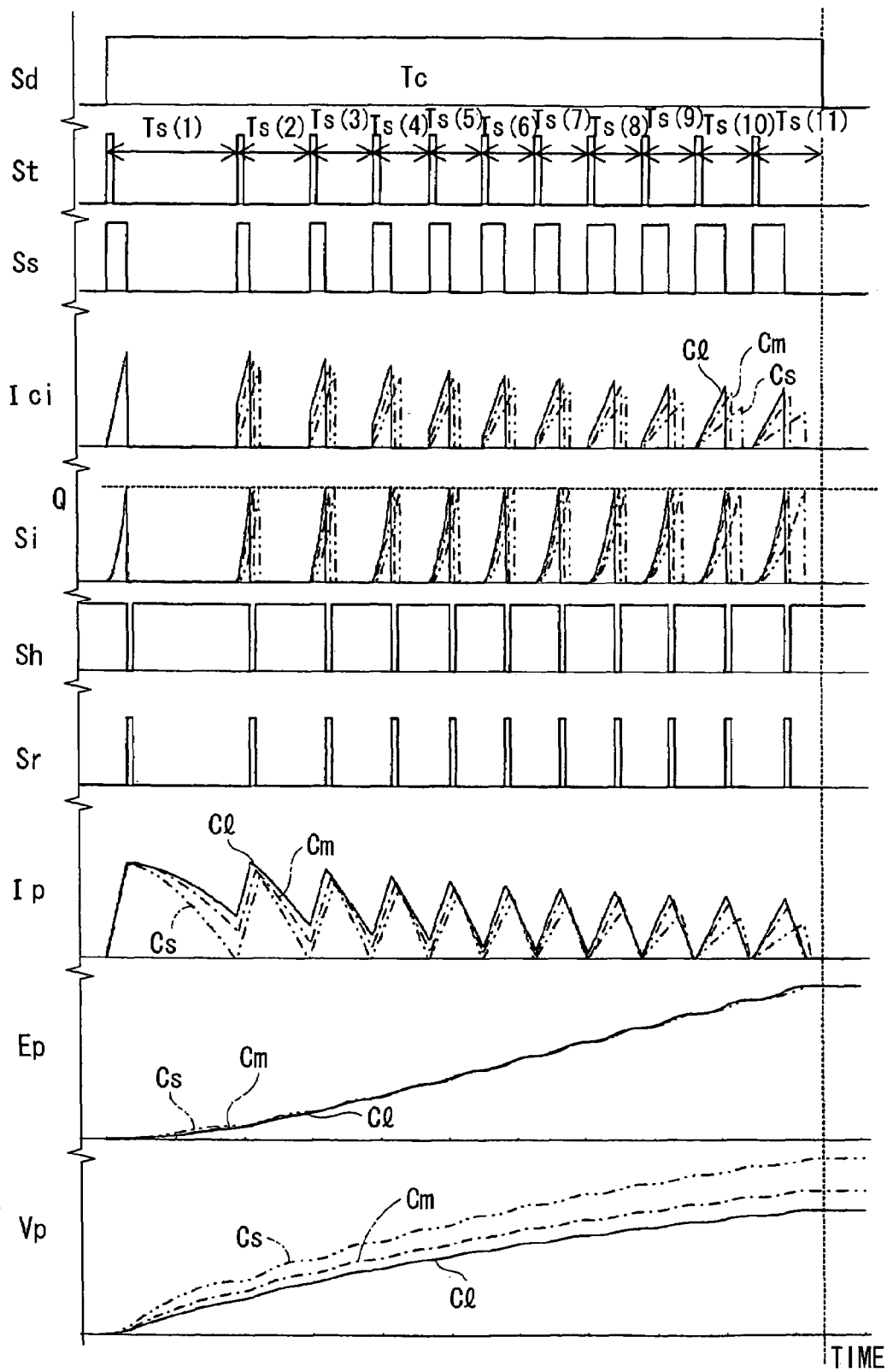
FIG. 11 is a time chart showing the operation of each part in the charging operation in a driving device according to a fifth embodiment of the present invention.

Furthermore, as shown in FIG. 11, at least when the electrostatic capacitance of the piezoelectric actuators P1 to P4 is small, flywheel current is prevented from flowing when the charging switch SW1 is turned on. Therefore, as compared with the first embodiment, the expansion rate of the piezoelectric actuators P1 to P4 can be more efficiently suppressed from being varied due to the variation of the electrostatic capacitance.

Still furthermore, according to the fifth embodiment, the switching period Ts is set on the basis of the case where the electrostatic. capacitance of the piezoelectric actuators P1 to P4 is small, and thus the switching period Ts can be set to a smaller value as compared with the fourth embodiment.

Accordingly, as compared with the fourth embodiment, the switching frequency N can be set to a larger value, and thus the piezoelectric actuators P1 to P4 can be charged so as to expand more smoothly.

Sixth Embodiment

The driving device of the sixth embodiment is different from the driving device 1 of the first embodiment in that the target charge amount Q is not fixed and the target charge amount Qn is set so that the variation amount G of the voltage per unit time applied to the piezoelectric actuators P1 to P4 is equal among the respective switching periods Ts(n).

Specifically, in the driving device of the sixth embodiment, the target charge amount Qn is calculated by using the following equation (2) so that the variation amount G of the voltage is equal among the respective switching periods Ts(n).

$$Q_n = Q_t \left(\frac{\sum_{k=1}^{n} T_s(k)}{T_c}\right)^2 - \sum_{k=1}^{n} Q(k-1) \quad (2)$$

The target charge amount Qn can be calculated as above for the following reasons.

First, the total charge amount Qt to be discharged from the buffer capacitor C1 within the charging period Tc corresponds to the value acquired by dividing the energy instruction value E by the voltage value V as defined in the following equation (3).

$$Q_t = E/V \quad (3)$$

The variation amount G of the voltage corresponds to the value acquired by dividing the voltage value Va by the charging period Tc as defined in the following equation (4). Here, Va represents the voltage value applied to the piezoelectric actuators P1 to P4 when the charging is finished.

$$G = V_a/T_c \quad (4)$$

Here, assuming that V1 represents the voltage value applied to the piezoelectric actuators P1 to P4 when the charging switch SW1 is first turned off in the charging period Tc, the variation amount G1 of the voltage when the charging switch SW1 is first turned off corresponds to the value acquired by dividing the voltage value V1 by the switching period Ts(1) (that is, the period Ts(1) when the charging switch SW1 is first turned on) as indicated by the following equation (5).

$$G_1 = V_1/T_{s(1)} \quad (5)$$

On the other hand, the charge energy to be charged in the piezoelectric actuators P1 to P4 during the charging period Tc (that is, the energy instruction value E) can be represented as $E = \{C \times (V_a)^2\}/2$, when the electrostatic capacitance of the piezoelectric actuators P1 to P4 is represented by C, and thus the voltage value Va can be represented by the following equation (6) by modifying the above equation.

$$V_a = \sqrt{\frac{2E}{C}} \quad (6)$$

Furthermore, the charge energy to be charged in the piezoelectric actuators in the charging period Tc (that is, the energy instruction value) can be also represented as E=QtV by modifying the above equation (3), and thus the following equation (7) can be derived by substituting the right-hand side of this equation into E of the above equation (6).

$$V_a = \sqrt{\frac{2Q_t V}{C}} \quad (7)$$

Accordingly, by substituting the right-hand side of the above equation (7) into Va of the above equation (4), the following equation (8) can be derived.

$$G = \frac{\sqrt{2Q_t V/C}}{T_c} \quad (8)$$

Likewise, the charge energy E1 to be charged in the piezoelectric actuators P1 to. P4 until the charging switch SW1 is first turned off can be represented as $E1 = \{CX(V1)^2\}/2$, and thus the voltage value V1 can be represented by the following equation (9) by modifying the above equation.

$$V_1 = \sqrt{\frac{2Q_1 V}{C}} \quad (9)$$

Accordingly, the variation amount G1 of the voltage can be represented by the following equation (10) by substituting the right-hand side of the equation (9) into V1 of the equation (5).

$$G_1 = \frac{\sqrt{2Q_1 V/C}}{T_{s(1)}} \quad (10)$$

In the sixth embodiment, the variation amount G of the voltage and the variation amount G1 of the voltage may be set to be equal to each other (G=G1) so that the variation amount G of the voltage is equal among the respective switching periods Ts(n).

Therefore, if the target charge amount Q1 is derived by substituting the right-hand side of the equation (8) and the right-hand side of the equation (10) into G=G1, the target charge amount Q1 can be represented by the following equation (11).

$$Q_1 = Q_t \left(\frac{T_{s(1)}}{T_c}\right)^2 \quad (11)$$

Accordingly, the target charge amount Q2 when the charging switch SW1 is secondly turned on can be likewise derived.

Specifically, the variation amount G2 of the voltage can be represented by G2=V2/{Ts(1)+Ts(2)}.

Next, the charge energy E2 to be charged in the piezoelectric actuators P1 to P4 until the charging switch SW1 is secondly turned off can be represented as $E2 = \{C(V2)^2\}/2 = (Q1+Q2)V$, and thus the voltage value V2 applied to the piezoelectric actuators P1 to P4 when the charging switch SW1 is secondly turned off can be represented by the following equation (12).

$$V_2 = \sqrt{\frac{2(Q_1 + Q_2) \cdot V}{C}} \quad (12)$$

Therefore, the variation amount G2 of the voltage can be represented by the following equation (13) by substituting the right-hand side of the equation (12) into V2 of G2=V2/{Ts(1)+Ts(2)}.

$$G_2 = \frac{\sqrt{2(Q_1 + Q_2) \cdot V/C}}{T_{s(1)} + T_{s(2)}} \quad (13)$$

The variation amount G2 of the voltage may be set to be equal to the variation amount G of the voltage, and thus the target charge amount Q2 can be represented by the following equation (14) on the basis of the equations (8) and (13).

$$Q_2 = Q_t \left(\frac{T_1 + T_2}{T_c}\right)^2 - Q_1 \quad (14)$$

Likewise, the target charge amount Q3 when the charging switch SW1 is thirdly turned on can be represented by the following equation (15).

$$Q_3 = Q_t \left(\frac{T_1 + T_2 + T_3}{T_c}\right)^2 - (Q_1 + Q_2) \quad (15)$$

Accordingly, the target charge amount Qn when the charging switch SW1 is turned on at the n-th time can be represented by the equation (2) from the equations (11), (14) and (15).

Next, the processing executed by the charging switch controller 90 of the driving device of the sixth embodiment will be described hereunder with reference to FIG. 12.

Figure 12:
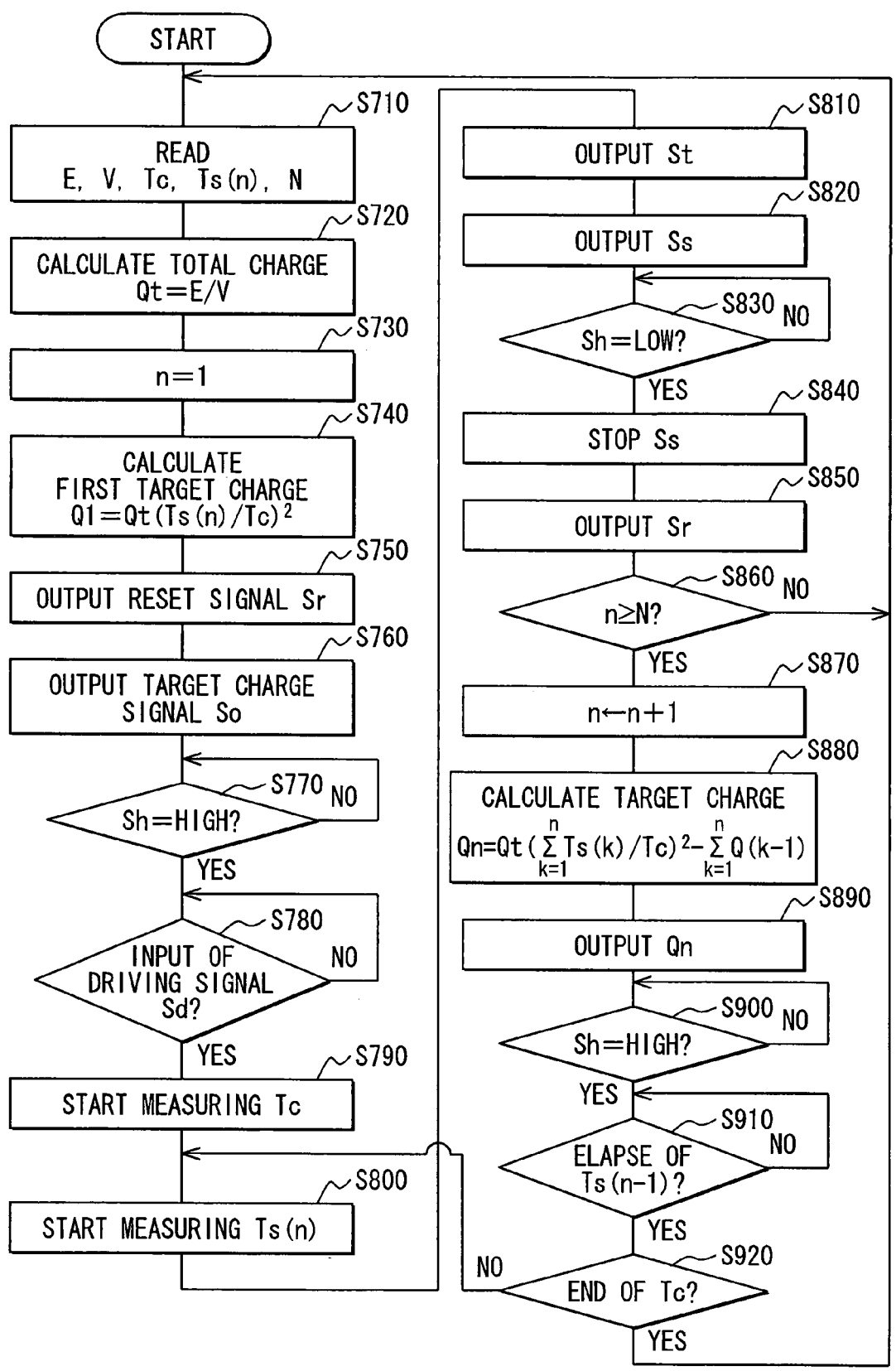
FIG. 12 is a flowchart showing the processing executed by CPU of a charging switch controller of a driving device according to a sixth embodiment of the present invention.

When the charging switch controller 90 of the driving device according to the sixth embodiment starts the processing of FIG. 12, in S710 the energy instruction value E, the charging period Tc, the switching period Ts(n) and the switching frequency N are read out from ROM, and also the voltage value V of the buffer capacitor C1 is acquired from the boosting control circuit 18.

Subsequently, in S720, the energy instruction value E is divided by the voltage value V to calculate the total charge amount Qt (Qt=E/V). In S730, 1 is substituted into n, and in S740, the target charge amount Qn (that is, the first target charge amount Q1) is calculated on the basis of the equation (2). Subsequently, the integration reset signal Sr is output for a predetermined time in S750, and the target charge amount setting signal So representing the target charge amount Q1 is output in the subsequent S760. Then, it is checked in S770 whether the signal level of the determination signal Sh is high or not.

If it is determined in S770 that the signal level of the determination signal Sh is not high, the processing of S770 is repetitively executed. Conversely, if it is determined in S770 that the signal level of the determination signal Sh is high, the processing proceeds to S780.

In S780, it is checked whether the driving signal Sd is input. If it is determined in S780 that no driving signal Sd is input, the processing of S780 is repetitively executed. Conversely, if it is determined in S780 that the driving signal Sd is input, the processing proceeds to S790.

In S790, the measurement of the charging period Tc is started, and also the cylinder selecting switching signal is output. In the subsequent S800, the measurement of the switching period Ts(n) is started, and the switching period signal St is output for a predetermined time in the subsequent S810. Then, in S820, the charging switching signal Ss is output. It is checked in the subsequent S830 whether the signal level of the determination signal Sh is low or not.

If it is determined in S830 that the signal level of the determination signal Sh is not low, the processing of S830 is repetitively executed. Conversely, if it is determined in S830 that the signal level of the determination signal Sh is low, the processing proceeds to S840.

In S840, the output of the charging switching signal Ss is stopped, and in the subsequent S850, the integration reset signal Sr is output for a predetermined time. Then, it is checked in S860 whether the value of n is not less than the switching frequency N. If it is determined in S860 that the value of n is not less than the switching frequency N, the processing proceeds to S710. Conversely, if it is determined in S860 that the value of n is less than the switching frequency N, the processing proceeds to S870.

In S870, n is incremented by added 1 to the last value. In the subsequent S880, the target charge amount Qn is calculated on the basis of the equation (2). In S890, the target charge amount setting signal So representing the target charge amount Qn calculated in S880 is output. It is checked in the subsequent S900 whether the signal level of the determination signal Sh is high.

If it is determined in S900 that the signal level of the determination signal Sh is not high, the processing of S900 is repetitively executed. Conversely, if it is determined in S900 that the signal level of the determination signal Sh is high, the processing proceeds to S910.

In S910, it is checked whether the switching period Ts(n−1) has elapsed from the start of the measurement in S800. If it is determined in S910 that the switching period Ts(n−1) has not elapsed, the processing of S910 is repetitively executed. Conversely, it is checked in S910 that the switching period Ts(n−1) has elapsed, the processing proceeds to S920.

In S920, it is checked whether the charging period Tc has elapsed (finished) from the start of the measurement in S790. If it is determined in S920 that the charging period Tc has not finished, the processing proceeds to S800. Conversely, if it is determined in S920 that the charging period Tc has finished, the output of the cylinder selecting switching signal is stopped, and the processing proceeds to S710.

Figure 13:
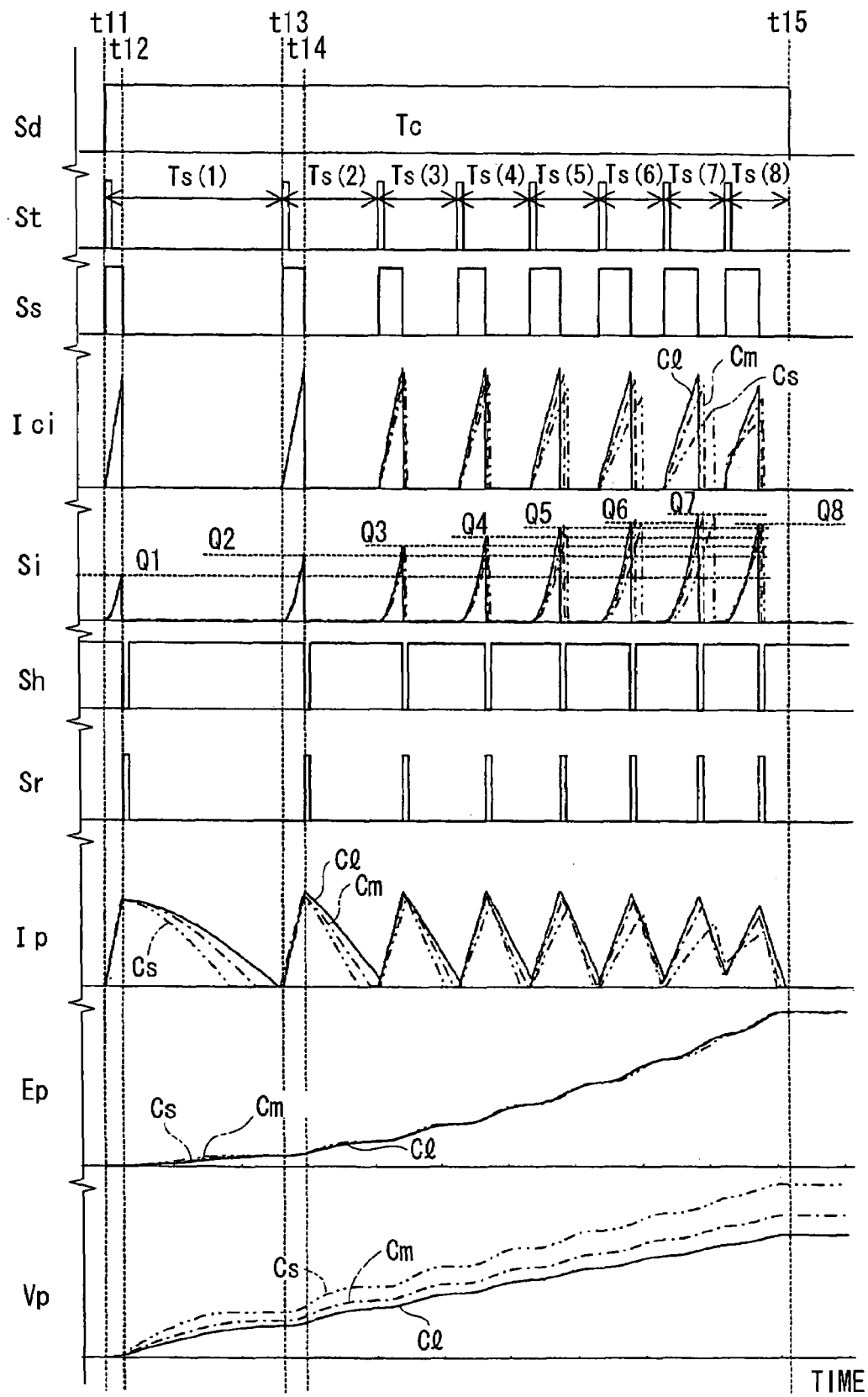
FIG. 13 is a time chart showing the operation of each part in the charging operation in the driving device according to the sixth embodiment.

Next, the operation of each part when the driving device of the sixth embodiment charges the piezoelectric actuators P1 to P4 will be described with reference to FIG. 13.

In the driving device of the sixth embodiment, the target charge amount Q1 is input to the non-inverting input terminal (+) of the determining circuit 80 (S760). When the driving signal Sd is input to the switch controller 50 at time ti1 as shown in FIG. 13 (S780: YES), both the switching period signal St and the charging switching signal Ss are output (S810, S820), and the cylinder selecting switching signal is output to the cylinder selecting switch SWa.

At this time, the buffer capacitor current Ic1 flows from the buffer capacitor C1 through the charging circuit 30 to the piezoelectric actuator P1 as described above.

When the charge amount represented by the integration signal Si reaches the target charge amount Q1 at time t12, the output level of the determination signal Sh is switched to low level (S830: YES), and the output of the charging switching signal Ss is stopped (S840).

At this time, the flywheel current flows through the parasitic diode D2 to the piezoelectric actuator P1 as described above.

At the time t12, the charging switch controller 90 outputs the integration reset signal Sr for a predetermined time, and the target charge amount Q2 is calculated and input to the non-inverting input terminal (+) of the determining circuit 80 (S880, S890).

When the switching period signal St is input again at time t13, the same operation as the time t11 is carried out, and when the charge amount represented by the integration signal Si reaches the target charge amount Q2 at time t14, the same operation as the time t12 is carried out.

Thereafter, the operation of turning on the charging switch SW1 every switching period Ts(n) and also turning off the switch SW1 every time the integration signal Si reaches the target charge amount Qn is repeated until a time t15.

According to the driving device of the sixth embodiment, irrespective of the temperature variation, the charge energy in one turn-on operation of the charging switch SW1 can be fixed while the switching period Ts when the charging switch SW1 is turned on is fixed. Thus the same advantage as the first embodiment can be acquired.

Furthermore, according to the sixth embodiment, the variation amount Gn of the voltage every ON-period of the charging switch SW1 is set to be equal, so that the expansion rate of the piezoelectric actuators P1 to P4 every ON-period of the charging switch SW1 can be set to be equal.

Seventh Embodiment

In the fourth embodiment and the fifth embodiment, the switching period Ts(n) is set so that the flywheel current has been already prevented from flowing through the discharge circuit 40 at the output time of the switching period St. However, by constructing the driving device as shown in FIG. 14, the switching period Ts(n) as described above can be set.

Figure 2:
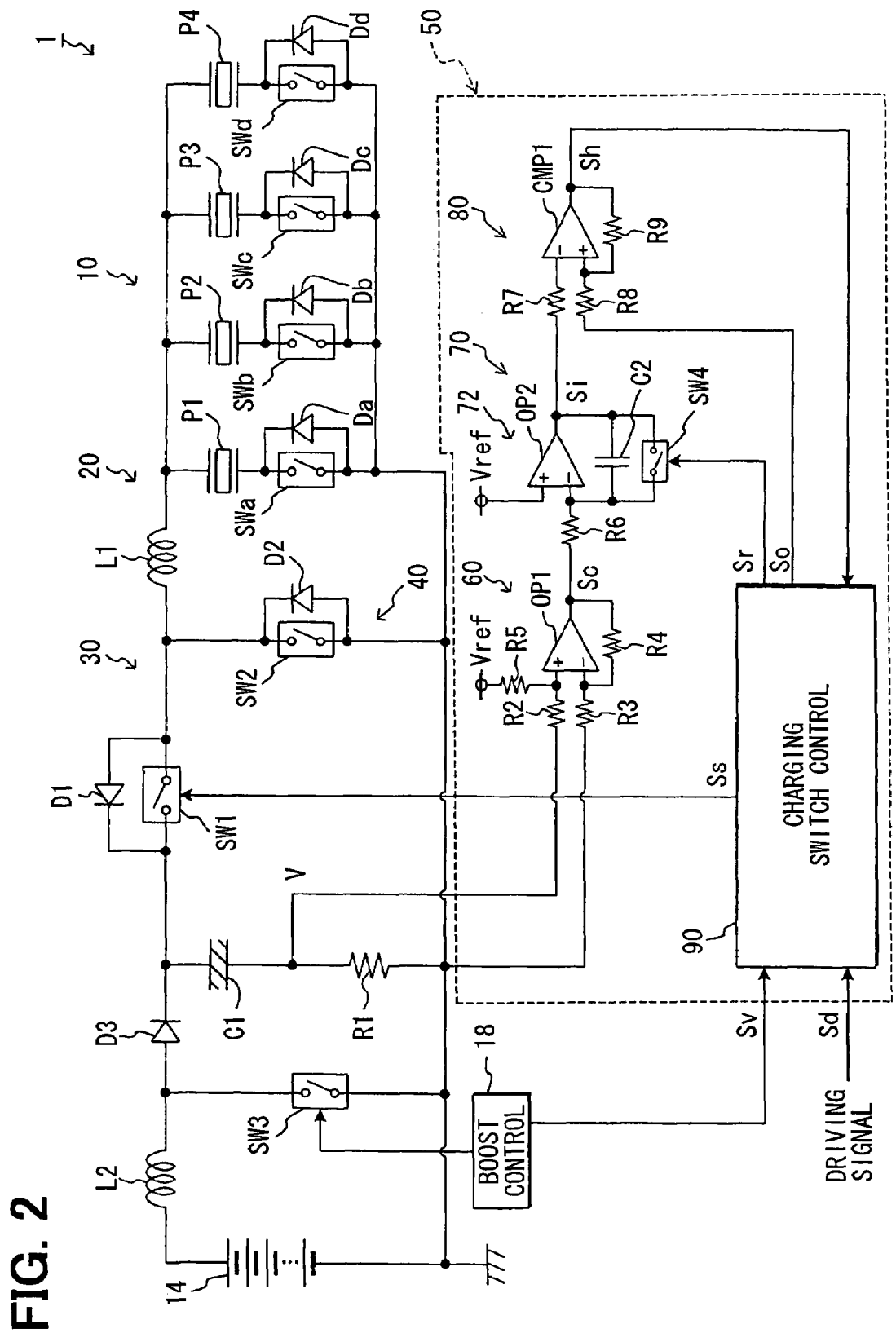
FIG. 2 is a circuit diagram showing a part of a switch controller which controls a charging switch.
Figure 14:
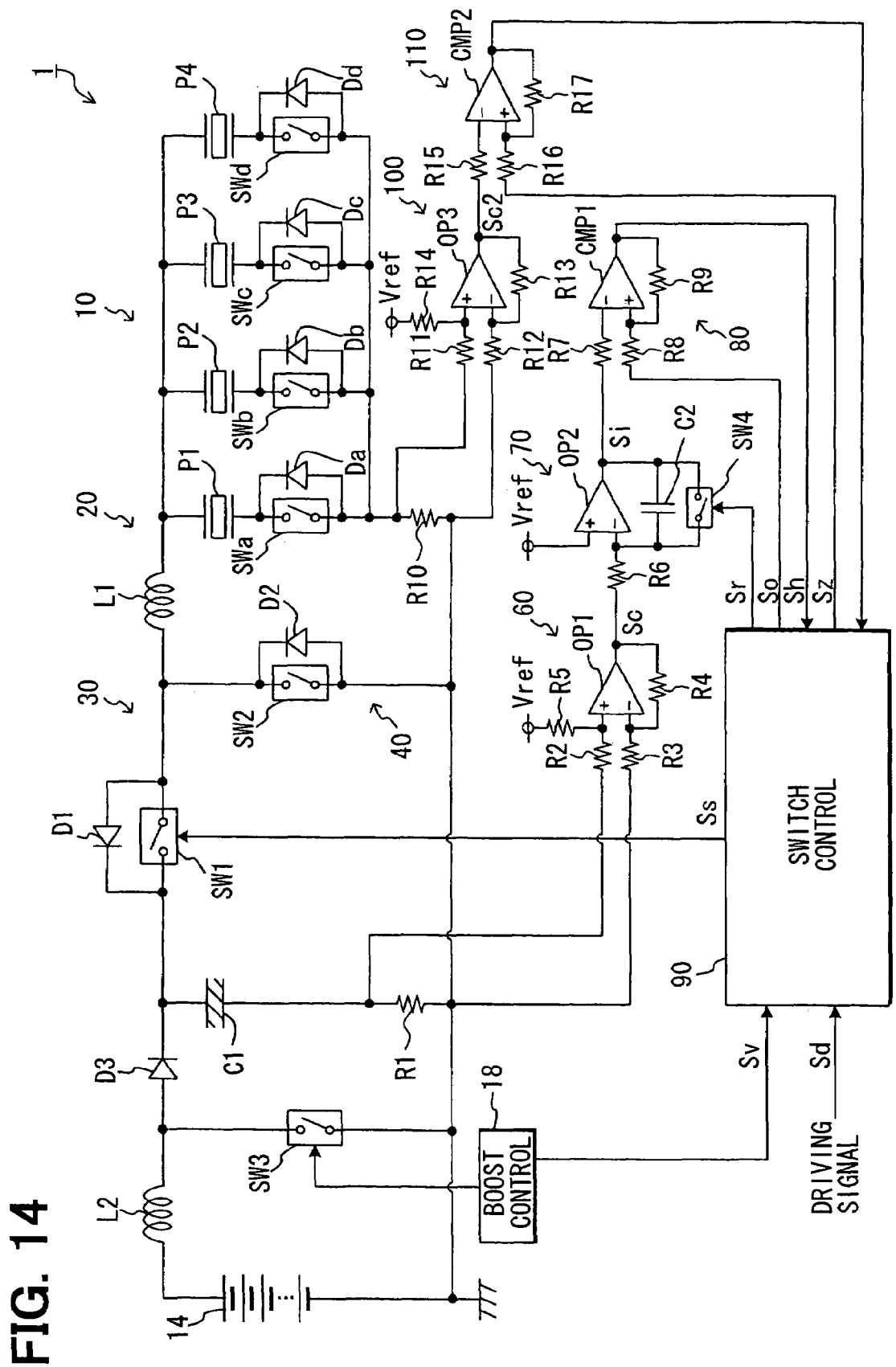
FIG. 14 is a circuit diagram showing a driving device of a modification of the fourth and fifth embodiments.

As shown in FIG. 14, the driving device 1 is designed so that the current detecting resistor R10 for detecting the charge current flowing through the piezoelectric actuators P1 to P4 under charging operation, a current detecting circuit 100 for detecting the charge current and a determining circuit 110 for determining whether the flow of the charge current detected by the current detecting circuit 100 is stopped are additionally provided to the driving device 1 of the first embodiment (FIG. 2). The current detecting resistor R10 is connected between an end portion at the cylinder selecting switch (SWa to SWd) side of the parallel circuit 10 and the ground line.

The current detecting circuit 100 has resistors R11, R12, R13, R14 and an operational amplifier OP3. The connection point between the current detecting resistor R10 and the parallel circuit 10 is connected through the resistor R11 to the non-inverting input terminal (+) of the operational amplifier OP3. The connection point between the current detecting resistor R10 and the ground line is connected through the R12 to the inverting input terminal (−) of the operational amplifier OP3.

Therefore, a current detecting signal Sc2 represented by the voltage value acquired by amplifying the potential between both terminals of the current detecting resistor R10 at a predetermined gain is output from the output terminal of the operational amplifier OP3.

The reference voltage Vref is input through the resistor R14 to the non-inverting input terminal (+) of the operational amplifier OP3. The determination circuit 110 has resistors R15, R16, R17 and a comparator CMP2. The current detection signal Sc2 is input through the resistor R15 to the inverting input terminal (−) of the comparator CMP2, and a current zero threshold value signal Sz output from the charging switch controller 90 is input through the resistor R16 to the non-inverting input terminal (+) of the comparator CMP2. The current zero threshold value signal Sz is used as a threshold value with which the determining circuit 110 checks whether no charge current (more specifically, the flywheel current) has just flowed to the piezoelectric actuators P1 to P4, Thus, it is input to the non-inverting input terminal (+).

Furthermore, the determining circuit 110 is constructed as a comparator CMP2 having hysteresis (Schmidt trigger) for switching the magnitude of the threshold value represented by the current zero threshold value signal in two stages in accordance with the output signal of the comparator CMP2.

As described above, in the driving device of this embodiment, when the signal level of the output signal from the determining circuit 110 is switched from low level to high level during charging operation, the flow of the charge current (more specifically, flywheel current) to the piezoelectric actuators P1 to P4 has been just stopped.

Accordingly, the time when the flow of the flywheel current has been just stopped can be known, and thus the switching period Ts(n) can be set so that the flow of the flywheel current to the discharge circuit 40 has been already stopped at the output time of the switching period signal St.

The setting of the switching period Ts(n) may be carried out at the shipping time of a vehicle in which the driving device is mounted, or carried out periodically.

The above embodiments may be modified in various ways. For example, although the boosting control circuit 18 turns on/off the boosting switch SW3 in the above embodiments, the switch controller 90 may turn on/off the boosting switch SW3.

What is claimed is:

1. A driving device for a piezoelectric actuator comprising:
an inductor connected to the piezoelectric actuator in series so that the inductor and the piezoelectric actuator forms a series circuit;
a charging circuit for supplying electric power from a DC power source through a charging switch to the series circuit;
a discharging circuit that is connected to the series circuit in parallel and discharging charges charged in the piezoelectric actuator through a discharging switch; and
a charge/discharge control unit for repeating a turn-on/off operation of the charging switch under a state that the discharging switch is turned off when a driving instruction is input from an external device, thereby charging and expanding the piezoelectric actuator,
wherein the charge/discharge control unit includes
a target value setting section for setting a target value of charge energy of the piezoelectric actuator during an ON-period of the charging switch based on charge energy to be charged in the piezoelectric actuator during one charging period and a power supply voltage of the DC power source,
a current detecting section for detecting charge current supplied from the DC power source to the series circuit when the charging switch is turned on,
an estimating section for estimating charge energy of the piezoelectric actuator during the ON-period of the charging switch by integrating the charge current detected by the current detecting section, and
a charging switch driving section for turning on the charging switch at a preset period when the driving instruction is input, and turning off the charging switch every time an estimation value estimated by the estimating section reaches the target value set by the target value setting section.

2. The driving device according to claim 1, wherein:
the estimating section derives an integration value of the charge current detected by the current detecting section as the estimation value; and the charging switch driving section turns off the charging switch when the integration value derived by the estimating section reaches the target value.

3. The driving device according to claim 1, wherein:
the target value setting section sets the target value so that a first target value when the charging switch is first turned on during one charging period of the charging switch driving unit is lower than the target value when the charging switch is turned on secondly or later.

4. The driving device according to claim 1, wherein:
the target value setting section sets the target value so that the target value is identical among the respective ON-periods of the charging switch; and
the target value setting section sets the period when the charging switch is turned on by the charging switch driving section so as to be shortened every time the charging switch is turned once or at plural times during one charging period of the charging switch driving section.

5. The driving device according to claim 1, wherein:
the target value setting section sets the target value so that a variation amount of the voltage per unit time applied to the piezoelectric actuator is identical among the respective periods when the charging switch is turned on by the charging switch driving section.

6. The driving device according to claim 1, further comprising:
a first diode connected to the charging switch in parallel so that a cathode thereof is at a positive-side of the DC power source; and
a second diode connected to the discharging switch in parallel so that a cathode thereof is at a positive-side of the DC power source.

* * * * *